(12) United States Patent
Branscomb et al.

(10) Patent No.: US 10,580,099 B2
(45) Date of Patent: *Mar. 3, 2020

(54) SYSTEMS AND METHODS FOR SECURE ENCRYPTION OF REAL ESTATE TITLES AND PERMISSIONS

(71) Applicant: GeoFrenzy, Inc., Tiburon, CA (US)

(72) Inventors: Bennett Hill Branscomb, Ingleside, TX (US); Benjamin T. Jones, Henderson, NV (US)

(73) Assignee: GEOFRENZY, INC., Tiburon, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/353,757

(22) Filed: Mar. 14, 2019

(65) Prior Publication Data
US 2019/0213699 A1 Jul. 11, 2019

Related U.S. Application Data

(63) Continuation of application No. 15/582,179, filed on Apr. 28, 2017, now Pat. No. 10,235,726, which is a
(Continued)

(51) Int. Cl.
*H04L 29/08* (2006.01)
*G06Q 50/16* (2012.01)
(Continued)

(52) U.S. Cl.
CPC .......... *G06Q 50/163* (2013.01); *G06Q 10/00* (2013.01); *G06Q 10/10* (2013.01); *G06Q 50/167* (2013.01);
(Continued)

(58) Field of Classification Search
CPC .. G06Q 50/167; H04L 9/088; G06F 17/30312
See application file for complete search history.

(56) References Cited

U.S. PATENT DOCUMENTS 6,844,990 B2 1/2005 Artonne et al.
6,865,028 B2 3/2005 Moustier et al.
(Continued)

OTHER PUBLICATIONS

Christian Maihofer, "A Survey of Geocast Routing Protocols," IEEE Communications Surveys Second Quarter 2004, vol. 6, No. 2, pp. 32-42 (2004).
(Continued)

*Primary Examiner* — Philip J Chea
*Assistant Examiner* — Wuji Chen
(74) *Attorney, Agent, or Firm* — Neo IP

(57) ABSTRACT

Methods and systems for managing real estate permissions are disclosed. At least one user device is in network communication with a server platform. The server platform comprises a database storing at least one master key associated with at least one piece of real estate. The at least one user device is operable to unlock the at least one master key by at least one corresponding slave key for permission. The at least one user device is operable to function within the at least one piece of real estate based on obtained permission. At least one geofence is associated with the at least one piece of real estate. The at least on geofence is defined by at least one geographic designator associated with at least one Internet Protocol (IP) address.

16 Claims, 10 Drawing Sheets

Related U.S. Application Data continuation-in-part of application No. 14/811,234, filed on Jul. 28, 2015, now Pat. No. 10,121,215, which is a continuation-in-part of application No. 14/755,669, filed on Jun. 30, 2015, now Pat. No. 9,906,902, which is a continuation-in-part of application No. 14/745,951, filed on Jun. 22, 2015, now Pat. No. 9,906,609, which is a continuation-in-part of application No. 14/728,259, filed on Jun. 2, 2015, now Pat. No. 9,363,638, said application No. 14/811,234 is a continuation-in-part of application No. 14/740,557, filed on Jun. 16, 2015, now Pat. No. 9,280,559, which is a continuation of application No. 14/728,259, filed on Jun. 2, 2015, now Pat. No. 9,363,638, said application No. 15/582,179 is a continuation-in-part of application No. 14/495,691, filed on Sep. 24, 2014, now abandoned, said application No. 14/811,234 is a continuation-in-part of application No. 14/728,259, filed on Jun. 2, 2015, now Pat. No. 9,363,638, said application No. 14/755,669 is a continuation-in-part of application No. 14/728,259, filed on Jun. 2, 2015, now Pat. No. 9,363,638, said application No. 14/811,234 is a continuation-in-part of application No. 14/745,951, filed on Jun. 22, 2015, now Pat. No. 9,906,609.

(60) Provisional application No. 62/030,252, filed on Jul. 29, 2014, provisional application No. 61/881,503, filed on Sep. 24, 2013.

(51) Int. Cl.
    *H04L 29/06*     (2006.01)
    *H04W 12/04*     (2009.01)
    *H04W 4/021*     (2018.01)
    *H04L 9/08*     (2006.01)
    *G06Q 10/00*     (2012.01)
    *G06Q 10/10*     (2012.01)

(52) U.S. Cl.
    CPC ............ H04L 9/088 (2013.01); H04L 63/107 (2013.01); H04W 4/021 (2013.01); H04W 12/04 (2013.01); *G06Q 2220/10* (2013.01); *H04L 2209/56* (2013.01)

(56) References Cited

U.S. PATENT DOCUMENTS

| | | |
|---|---|---|
| 6,885,817 B2 | 4/2005 | Artonne et al. |
| 6,895,180 B2 | 5/2005 | Artonne et al. |
| 6,920,129 B2 | 7/2005 | Preston et al. |
| 7,498,985 B1 | 3/2009 | Woo et al. |
| 7,525,933 B1 | 4/2009 | Hall |
| 7,613,467 B2 | 11/2009 | Fleischman |
| 7,865,416 B1 | 1/2011 | Graff et al. |
| 8,016,426 B2 | 9/2011 | Artonne et al. |
| 8,052,081 B2 | 11/2011 | Olm et al. |
| 8,103,567 B1 | 1/2012 | Graff et al. |
| 8,149,801 B2 | 4/2012 | Hall |
| 8,285,628 B1 | 10/2012 | Graff et al. |
| 8,292,215 B2 | 10/2012 | Olm et al. |
| 8,346,578 B1 | 1/2013 | Hopkins et al. |
| 8,483,652 B2 | 7/2013 | Hall |
| 8,493,207 B2 | 7/2013 | Diem |
| 8,510,190 B1 | 8/2013 | Graff et al. |
| 8,588,818 B2 | 11/2013 | Huang et al. |
| 8,634,804 B2 | 1/2014 | McNamara et al. |
| 8,717,166 B2 | 5/2014 | Diem |
| 8,718,598 B2 | 5/2014 | Johnson |
| 8,753,155 B2 | 6/2014 | Olm et al. |
| 8,812,027 B2 | 8/2014 | Obermeyer et al. |
| 8,832,293 B2 | 9/2014 | Wang |
| 8,837,363 B2 | 9/2014 | Jones et al. |
| 8,880,101 B2 | 11/2014 | Fraccaroli |
| 8,897,741 B2 | 11/2014 | Johnson |
| 8,971,930 B2 | 3/2015 | Li et al. |
| 8,991,740 B2 | 3/2015 | Olm et al. |
| 9,071,931 B2 | 6/2015 | Diem |
| 9,280,559 B1 | 3/2016 | Jones |
| 9,363,638 B1 | 6/2016 | Jones |
| 9,491,577 B1 | 11/2016 | Jones |
| 9,875,251 B2 | 1/2018 | Jones |
| 9,906,609 B2 | 2/2018 | Jones |
| 9,906,902 B2 | 2/2018 | Jones |
| 2001/0015965 A1* | 8/2001 | Preston ................. G01S 5/0027 370/338 |
| 2002/0035432 A1 | 3/2002 | Kubica et al. |
| 2003/0036949 A1* | 2/2003 | Kaddeche ............. G06Q 30/02 705/14.39 |
| 2004/0148294 A1 | 7/2004 | Wilkie et al. |
| 2005/0203768 A1* | 9/2005 | Florance ............ G06Q 30/0643 701/438 |
| 2007/0220038 A1 | 9/2007 | Crago |
| 2008/0291318 A1 | 11/2008 | Artonne et al. |
| 2010/0044499 A1 | 2/2010 | Dragan et al. |
| 2010/0198714 A1* | 8/2010 | Orfano ................... G06Q 20/10 705/35 |
| 2011/0105151 A1 | 5/2011 | Hall |
| 2011/0136468 A1* | 6/2011 | McNamara ............ G06Q 20/14 455/406 |
| 2011/0208797 A1 | 8/2011 | Kim |
| 2012/0102489 A1* | 4/2012 | Staiman ............. G06Q 10/0631 718/1 |
| 2012/0172027 A1* | 7/2012 | Partheesh ............. H04W 4/021 455/420 |
| 2012/0265685 A1 | 10/2012 | Brudnicki et al. |
| 2013/0091016 A1 | 4/2013 | Shutter |
| 2013/0225196 A1 | 8/2013 | James et al. |
| 2013/0267196 A1 | 10/2013 | Leemet et al. |
| 2013/0314398 A1 | 11/2013 | Coates et al. |
| 2014/0057648 A1 | 2/2014 | Lyman et al. |
| 2014/0100900 A1* | 4/2014 | Abhyanker ............. H04L 67/18 705/5 |
| 2014/0171013 A1 | 6/2014 | Varoglu et al. |
| 2014/0208397 A1 | 7/2014 | Peterson |
| 2014/0248887 A1 | 9/2014 | Alkabra et al. |
| 2014/0282829 A1 | 9/2014 | Dabbiere et al. |
| 2014/0295944 A1 | 10/2014 | Faircloth |
| 2014/0335823 A1 | 11/2014 | Heredia et al. |
| 2014/0339355 A1 | 11/2014 | Olm et al. |
| 2014/0340473 A1 | 11/2014 | Artonne |
| 2015/0031398 A1 | 1/2015 | Rahnama |
| 2015/0087263 A1 | 3/2015 | Branscomb |
| 2015/0099461 A1* | 4/2015 | Holden ................. G01C 21/367 455/39 |
| 2015/0134143 A1* | 5/2015 | Willenborg .......... G05D 1/0094 701/2 |
| 2015/0172862 A1 | 6/2015 | Kau et al. |
| 2015/0281507 A1 | 10/2015 | Konen et al. |
| 2016/0007156 A1 | 1/2016 | Chiou et al. |
| 2016/0035054 A1 | 2/2016 | Branscomb et al. |
| 2016/0073225 A1 | 3/2016 | Ganesalingam et al. |
| 2016/0169696 A1* | 6/2016 | Butts, III ........... G01C 21/3476 701/438 |
| 2016/0203522 A1 | 7/2016 | Shiffert et al. |
| 2016/0358432 A1 | 12/2016 | Branscomb et al. |
| 2017/0150308 A1 | 5/2017 | Jones |
| 2017/0230791 A1 | 8/2017 | Jones |
| 2017/0238129 A1 | 8/2017 | Maier et al. |
| 2017/0249712 A1 | 8/2017 | Branscomb et al. |

OTHER PUBLICATIONS

Robert Barr, What 3 Words, Mar. 2015, v1.1, Lymm, Cheshire, UK.

* cited by examiner

SYSTEMS AND METHODS FOR SECURE ENCRYPTION OF REAL ESTATE TITLES AND PERMISSIONS

CROSS-REFERENCE TO RELATED APPLICATIONS

This application relates to and claims priority from the following U.S. patent applications. This application is a continuation of U.S. application Ser. No. 15/582,179, filed Apr. 28, 2017. U.S. application Ser. No. 15/582,179 is a continuation-in-part of U.S. application Ser. No. 14/495,691 filed Sep. 24, 2014 and is also a continuation-in-part of U.S. application Ser. No. 14/811,234, now U.S. Pat. No. 10,121,215, filed Jul. 28, 2015. U.S. application Ser. No. 14/495,691 claims priority from U.S. Provisional Application No. 61/881,503 filed on Sep. 24, 2013, and U.S. Provisional Application No. 62/030,252 filed on Jul. 29, 2014. U.S. application Ser. No. 14/811,234 claims priority from U.S. Provisional Application No. 62/030,252, filed Jul. 29, 2014. U.S. application Ser. No. 14/811,234 is also a continuation-in-part of U.S. application Ser. No. 14/755,669, now U.S. Pat. No. 9,906,902, filed Jun. 30, 2015, which is a continuation-in-part of both U.S. application Ser. No. 14/745,951, now U.S. Pat. No. 9,906,609, filed Jun. 22, 2015, and U.S. application Ser. No. 14/728,259, now U.S. Pat. No. 9,363,638, filed Jun. 2, 2015, with U.S. application Ser. No. 14/745,951, now U.S. Pat. No. 9,906,609, filed Jun. 22, 2015, being a continuation-in-part of U.S. application Ser. No. 14/728,259, now U.S. Pat. No. 9,363,638, filed Jun. 2, 2015. U.S. application Ser. No. 14/811,234 is also a continuation-in-part of U.S. application Ser. No. 14/745,951, now U.S. Pat. No. 9,906,609, filed Jun. 22, 2015, which is a continuation-in-part of U.S. application Ser. No. 14/728,259, now U.S. Pat. No. 9,363,638, filed Jun. 2, 2015. U.S. application Ser. No. 14/811,234 is also a continuation-in-part of U.S. application Ser. No. 14/740,557, now U.S. Pat. No. 9,280,559, filed Jun. 16, 2015, which is a continuation of U.S. application Ser. No. 14/728,259, now U.S. Pat. No. 9,363,638, filed Jun. 2, 2015. U.S. application Ser. No. 14/811,234 is also a continuation-in-part of U.S. application Ser. No. 14/728,259, now U.S. Pat. No. 9,363,638, filed Jun. 2, 2015. Each of the aforementioned applications and patents is incorporated herein by reference in its entirety.

BACKGROUND OF THE INVENTION

1. Field of the Invention

The present invention generally relates to systems and methods for managing real estate titles and permissions. More particularly, it relates to an encryption system for incorporating the metes-and-bounds legal title of real property into a separate estate and title system for the ownership and control of titles and permissions relating to real estate, and providing a platform and marketplace for facilitating creation and transfer of said titles and permissions as well as providing compensation and reimbursement for utilization of said titles and permissions.

2. Description of the Prior Art

Current real estate ownership and the title to real property has as its basis metes and bounds or area. The title of real estate is customarily insured when it is purchased. In certain jurisdictions, there is a separate "mineral" estate that can be sold or leased separately from the surface estate. In oil and gas exploration, it is customary to lease minerals from different owners than those who own the surface of the land. It is also possible to lease or purchase the mineral rights to different strata for certain formations at certain depths. These different "strata" may have different intrinsic market values and hence may be segmented as such for marketing purposes.

Today in technology, the widespread personal possession of mobile computing devices and their near-constant connectivity with data and telecommunications networks, coupled with very accurate GPS and network triangulation location calculators have created a critical problem for owners of real estate. As an example, a retail mall generally is a business where the owner of the "real estate" (landlord) rents space to store owners who sell to goods to customers who physically come to shop. These retail businesses count on the landlord of the mall to provide the necessary conditions for shopping. Some of these include the provision of heating and air conditioning, security services, ample parking and a varied selection of stores for shoppers to choose from. The landlord depends upon the shoppers to purchase from the merchants and the merchants to therefore be successful and able to pay their rent. Concerts, tradeshows, and sporting events are additional examples where the real estate and its owner are the basis behind the commerce within the metes and bounds as set forth in title and "owned." Systems and methods are therefore needed which provide for controlling the permissions and titles surrounding, inter alia, the virtual rights in these spaces.

Exemplary U.S. Patent documents in the prior art include:

US Pub. No. 2002/0035432 for "Method and system for spatially indexing land" by Kubica, filed Jun. 8, 2001 and published May 31, 2007, describes a method of spatially indexing land by selecting a parcel (100) of land and extending its boundaries (110) to include a portion of adjacent streets (125) and alleys (122) to define a cell (150). A unique identifier is assigned to the cell as well as a reference point (170) within the cell (150). The reference point has a known location in a global referencing system. An internet address is assigned to the cell which identifies its location, such as the location of the reference point within the cell. This information and other data associated with the cell is then stored in an OX Spatial Index database and includes the street address for the cell and other relevant information such as owner, what type building if any is on the property, location of utility lines, etc. A Spatial Internet Address which includes the geographic location of the cell is assigned for each cell and this information is also stored in the index. The index thereby created can be used for various applications such as determining a user's location and locating geographically relevant information by searching the index and connecting to websites associated with the user's vicinity.

U.S. Pub. No. 2004/0148294 for "Method of managing property development" by Wilkie, filed Mar. 4, 2002 and published Jul. 29, 2004 describes a computerised method for developing real property a land owner, builder, end buyers and a development manager are given participatory roles in the development process wherein returns produced by the development of land and realisation of development rights attaching to land are accessible to the land owner and other profit participants; realisation is not limited to receipt of a return on the land value only through the disposition of the land to a developer, and wherein the development can be carried out on a computer generated model of the land together with any improvements thereon and official titles to the real property can be issued by relevant authorities and a financial settlement able to occur on the titles prior to commencing and or completing any civil works or construction on the land.

U.S. Pat. No. 8,510,190 for "Securitized-real-property-related asset system" by Graff, filed Dec. 29, 2010 and issued Aug. 13, 2013 describes that illustratively, there can be a securitization system that is comprised of a computer or computers using a network, and a process, for the conversion of assets into marketable securities. In one embodiment, the securitization system includes a distribution system to distribute at least some of the marketable securities generated by the securitization system to one or more buyers. The process may utilize a new definition of securitization that expands the universe of securitizable assets, the universe of asset securitization methodologies, and the respective universes of securities and investment assets that can be designed and generated thereby.

U.S. Pat. No. 8,346,578 for "Systems and methods for using unmanned aerial vehicles" by Hopkins III, filed Aug. 26, 2011 and issued Jan. 1, 2013 describes systems and methods to process overhead imagery received from overhead image sources are described herein. Examples include accessing an aerial image including a property, determining an owner of the property, determining whether the owner of the property is eligible to be a member of a financial institution, determining whether the owner of the property has property insurance with the financial institution for the property type of the property in the aerial image, and presenting an offer for insurance to insure the property in the aerial image when the owner is determined to be eligible for the financial institution and does not already have insurance with the financial institution. Examples include accessing an aerial image of properties, determining damage estimates, and reserving resources to repair the properties based on the damage estimates. Examples include receiving information describing property damage, determining a cause, and based on the cause, conditionally deploying a unmanned aerial vehicle to perform insurance adjustment activities.

U.S. Pat. No. 8,285,628 for "Securitized pool of personal-small-aircraft mortgages system" by Graff, filed Jul. 6, 2007 and issued Oct. 9, 2012 describes that illustratively, there can be a securitization system that is comprised of a computer or computers using a network, and a process, for the conversion of assets into marketable securities. In one embodiment, the securitization system includes a distribution system to distribute at least some of the marketable securities generated by the securitization system to one or more buyers. The process may utilize a new definition of securitization that expands the universe of securitizable assets, the universe of asset securitization methodologies, and the universe of securities that can be designed and generated thereby.

U.S. Pat. No. 8,103,567 for "Securitized reusable personal asset system" by Graff, filed Jul. 6, 2007 and issued Jan. 24, 2012 describes that illustratively, there can be a securitization system that is comprised of a computer or computers using a network, and a process, for the conversion of assets into marketable securities. In one embodiment, the securitization system includes a distribution system to distribute at least some of the marketable securities generated by the securitization system to one or more buyers. The process may utilize a new definition of securitization that expands the universe of securitizable assets, the universe of asset securitization methodologies, and the universe of securities that can be designed and generated thereby.

U.S. Pat. No. 7,865,416 for "Securitized real-property-related asset system" by Graff, filed Jul. 6, 2007 and issued Jan. 4, 2011 describes that illustratively, there can be a securitization system that is comprised of a computer or computers using a network, and a process, for the conversion of assets into marketable securities. In one embodiment, the securitization system includes a distribution system to distribute at least some of the marketable securities generated by the securitization system to one or more buyers. The process may utilize a new definition of securitization that expands the universe of securitizable assets, the universe of asset securitization methodologies, and the universe of securities that can be designed and generated thereby.

U.S. Pat. No. 8,493,207 for "Location information sharing system and method for conveying location information based on user authorization" by Diem, filed Jul. 17, 2012 and issued Jul. 23, 2013 describes an improved system and method for defining an event based upon an object location and a user-defined zone and managing the conveyance of object location event information among computing devices where object location events are defined in terms of a condition based upon a relationship between user-defined zone information and object location information. One or more location information sources are associated with an object to provide the object location information. One or more user-defined zones are defined on a map and one or more object location events are defined. The occurrence of an object location event produces object location event information that is conveyed to users based on user identification codes. Accessibility to object location information, zone information, and object location event information is based upon an object location information access code, a zone information access code, and an object location event information access code, respectively.

U.S. Pat. No. 8,717,166 for "System and method for conveying location information via a plurality of information-sharing environments" by Diem, filed Jul. 23, 2013 and issued May 6, 2014, describes an improved system and method for defining an event based upon an object location and a user-defined zone and managing the conveyance of object location event information among computing devices where object location events are defined in terms of a condition based upon a relationship between user-defined zone information and object location information. One or more location information sources are associated with an object to provide the object location information. One or more user-defined zones are defined on a map and one or more object location events are defined. The occurrence of an object location event produces object location event information that is conveyed to users based on user identification codes. Accessibility to object location information, zone information, and object location event information is based upon an object location information access code, a zone information access code, and an object location event information access code, respectively.

U.S. Pat. No. 9,071,931 for "Location tracking system with interfaces for setting group zones, events and alerts based on multiple levels of administrative privileges" by Diem, filed Feb. 12, 2015 and issued Jun. 30, 2015, describes an improved system and method for defining an event based upon an object location and a user-defined zone and managing the conveyance of object location event information among computing devices where object location events are defined in terms of a condition based upon a relationship between user-defined zone information and object location information. One or more location information sources are associated with an object to provide the object location information. One or more user-defined zones are defined on a map and one or more object location events are defined. The occurrence of an object location event produces object location event information that is conveyed to users based on user identification codes. Accessibility to object location information, zone information, and object location event information is based upon an object location information access code, a zone information access code, and an object location event information access code, respectively.

U.S. Pub. No. 20150087263 for "Methods and Apparatus for Promotions and Large Scale Games in Geo-Fenced Venues" by Branscomb, filed Sep. 24, 2014 and published Mar. 26, 2015, describes a method and apparatus for a system's customer to capture a user's contact information or location during an event uses an application for a personal electronic device that senses a jolt registered by the accelerometer of the device, and/or the user's location based on location sensors within the device. In response, the user receives any combination of text, picture(s), sound, or encrypted barcode, specified by the customer. A method for providing geo-referenced, selective control of wireless, processor-based devices (e.g., smartphones) uses an encrypted software master key that is at least initially assigned to the owner-of-record of real property. The master key functions to enable, disable, activate or otherwise control programs on or features of processor-based devices that are determined to be within the geographic boundaries of the real property. In certain embodiments, a system is linked to real property records to assign the master key to the owner of record.

U.S. Pub. No. 20140057648 for "Passive dynamic geofencing for mobile devices" by Lyman, filed Jul. 29, 2013 and published Feb. 27, 2014, describes systems and methods for passive dynamic geofencing on a mobile device are discussed. For example, a method for passive dynamic geofencing can include operations such as monitoring a first parent geofence and a first plurality of child geofences; detecting crossing a boundary of the first parent geofence into a second parent geofence; loading the second parent geofence and a second plurality of child geofences encompassed by the second parent geofence; and monitoring the second parent geofence and the second plurality of child geofences.

U.S. Pat. No. 8,588,818 for "Location-based broadcast messaging to mobile devices located in or entering into a defined geographic area" by Huang, filed Nov. 8, 2011 and issued Nov. 19, 2013, describes for a location-based broadcast messaging service, a broadcast server receives a broadcast request from a business application server. The broadcast request includes a message, at least one identifier for target mobile devices, and an identifier for a location. The broadcast server sends a location query including the identifier for the location to location agents associated with the target mobile devices. In response to receiving the location query, each location agent determines whether the location of the associated mobile device is within or otherwise satisfies a requirement related to the identified location. If the location of the device is within the identified location or satisfies the requirement, the location agent sends a query response to the broadcast server and receives, from the broadcast server, the message included in the broadcast request. The broadcast request can include a time-period identifier, such that the location agent determines the device location during the time-period.

SUMMARY OF THE INVENTION

The present invention includes systems and methods for managing real estate titles and permissions, particularly a platform to incorporate the geographic designators, IP addresses, associated with the geographic designators, owners of real estate titles and permissions, and other parties of interest. In particular, the platform provides for management of the virtual space and virtual titles and permissions relating to the real estate.

One aspect of the present invention involves a system for managing real estate titles and permissions and a method for managing real estate titles and permissions. In one embodiment, the system involves a real estate titles and permissions platform including a database, wherein the database includes at least one master key associated with at least one geographic designator and at least one title and/or at least one permission associated with the at least one master key, wherein the database is operable to display at least one of the at least one title and/or the at least one permission associated with the at least one master key upon receiving a request including the at least one geographic designator, and wherein each of the at least one title and/or the at least one permission has at least one owner. In another embodiment, the system involves a real estate titles and permissions platform including a database, wherein the database includes at least one key associated with a prohibition relating to at least one geographic designator and/or a permission relating to the at least one geographic designator, wherein the at least one key is operable to be transferred or duplicated by an owner of the prohibition relating to the at least one geographic designator or the permission relating to the at least one geographic designator. In yet another embodiment, the method involves the steps of providing a key associated with real property boundaries to at least one electronic device, determining that a location of the at least one electronic device is on the real property boundaries or within the real property boundaries, and permitting the at least one electronic device to perform a function on the real property boundaries or within the real property boundaries.

One problem is that companies or individuals can effectively pirate the virtual real estate and related commerce using software which is currently standard free code provided by publically-available programs to draw geo-referenced "fences" on electronic maps (e.g., "Google Maps"). Using such graphics together with code that is on the processor-based device (e.g., a smartphone or tablet computer), companies in control of the devices are able to create an intrusive connection with their customer while he or she is inside the "envelope" of the real estate owner's property. This intrusion may be disruptive to the business activities and personal "space" of the "owner." The present invention provides systems and methods for "locking the (virtual) doors" of homes and commercial real estate.

Another problem is the lack of centralization of the titles and permissions relating to real estate. Real estate contains numerous titles, including surface title, mineral rights, virtual rights, airspace rights, water rights, etc. When certain activities are performed in relation to the real estate, owners of various rights and titles in the real estate are often owed compensation. However, due to the lack of a cohesive platform which contains the necessary information to compensate the appropriate owners of rights and titles in the real estate, compensation is often difficult. In addition, the definition of the metes and bounds of real property is often unclear. The present invention provides a platform which connects owners of rights and titles in real estate as well as other interested parties to greatly simplify the activities surrounding real estate.

DETAILED DESCRIPTION OF THE INVENTION

Figure 1:
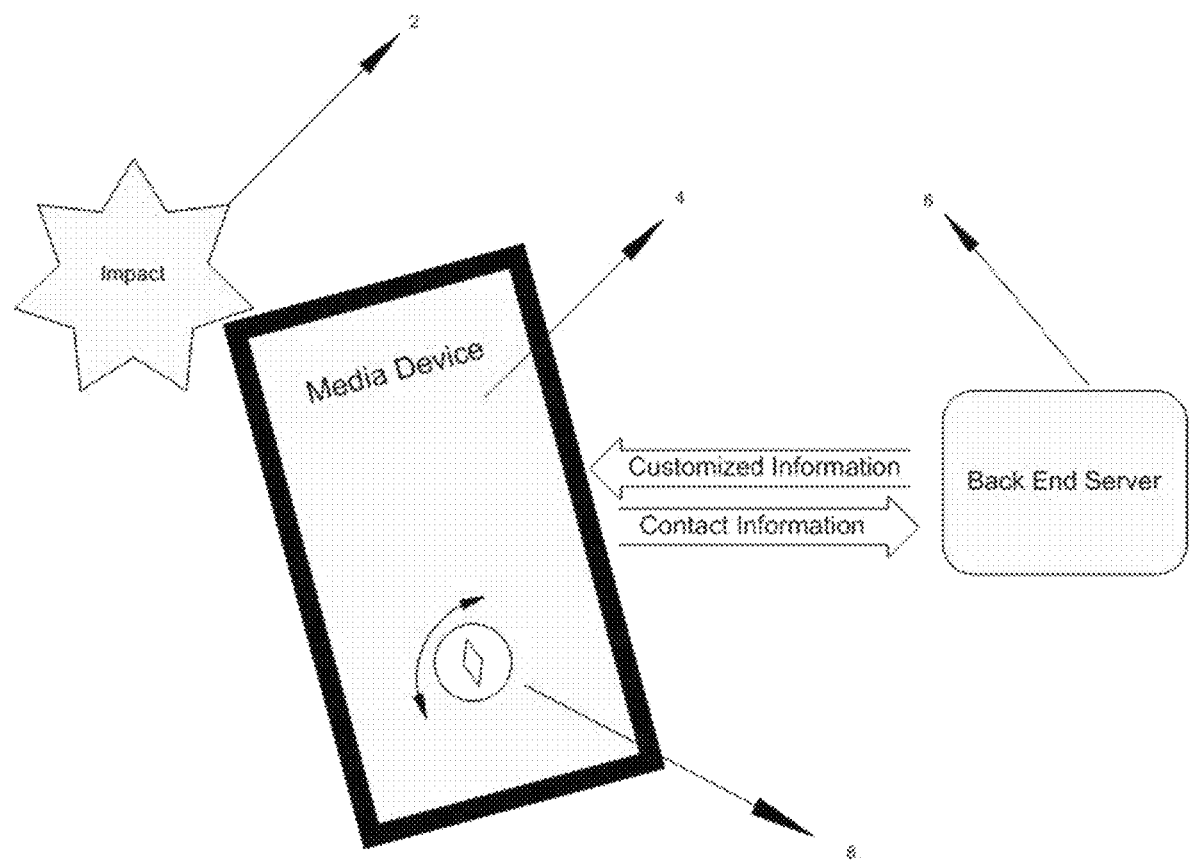
FIG. 1 is a schematic representation of an exemplary system for crowd promotions according to the invention.

The present invention involves a system for managing titles and permissions associated with real estate.

One aspect of the present invention includes a system for managing real estate titles and permissions and a method for managing real estate titles and permissions. In one embodiment, the system includes a real estate titles and permissions platform including a database, wherein the database includes at least one master key associated with at least one geographic designator and at least one title and/or at least one permission associated with the at least one master key, wherein the database is operable to display at least one of the at least one title and/or the at least one permission associated with the at least one master key upon receiving a request including the at least one geographic designator, and wherein each of the at least one title and/or the at least one permission has at least one owner. In another embodiment, the system includes a real estate titles and permissions platform including a database, wherein the database includes at least one key associated with a prohibition relating to at least one geographic designator and/or a permission relating to the at least one geographic designator, wherein the at least one key is operable to be transferred or duplicated by an owner of the prohibition relating to the at least one geographic designator or the permission relating to the at least one geographic designator. In yet another embodiment, the method includes the steps of providing a key associated with real property boundaries to at least one electronic device, determining that a location of the at least one electronic device is on the real property boundaries or within the real property boundaries, and permitting the at least one electronic device to perform a function on the real property boundaries or within the real property boundaries.

Fundamental to the present invention is the fact that the owners of real property have the right to control that real estate and the activities of those who venture inside the metes and bounds of these spaces. Different titles and permissions are associated with different aspects of the real estate. By way of example and not limitation, such titles and limitations include surface rights, a real property title, mineral rights, air rights, internet activity rights, wireless network activity rights (such as 3G, 4G, and other cell phone network rights), advertising rights, water rights, farming rights, rights surrounding the operation of predefined devices or all devices, virtual rights, drone permissions, etc. The present invention provides an efficient way to manage the rights associated with real estate, as well as entitlements derived from those rights.

Real property can be defined in a variety of ways. U.S. application Ser. Nos. 14/728,259, 14/745,951, 14/755,669 and 14/740,557 describe different ways in which real property can be defined. By way of example, and not limitation, geographic designators can be a latitudinal point and a longitudinal point, a set of latitudinal points and longitudinal points, a street address, a region of interest (ROI), a county, a city, a municipality, and/or a neighborhood. Significantly, these documents describe a registration system for registering real property which involves defining a geofence using at least one geographic designator, wherein the at least one geographic designator includes an internet protocol (IP) address. Each IP address is preferably a unique identifier of the geofence. While those documents discuss registering a geofence in a database of geofences using geographic designators and IP addresses, there is a need for a centralized system and method of managing titles and permissions relating to real estate.

Preferably, the system for managing real estate titles and permissions incorporates defining real property using geographic designators to create geofences. Preferably, the geographic designators and/or geofences are associated with or defined by IP addresses. Preferably, the IP addresses are IPv6 addresses. In other embodiments, the IP addresses are IPv4 addresses, IPv8 addresses, or IPvX addresses. Even more preferably, the geographic designators, geofences, and IP addresses are registered in a database or registry of geofences. In another embodiment, the system utilizes a master key to define real property. The master key is preferably an identifier of the real property for every title and/or permission. In one embodiment, the master key is a string of characters which acts as an identifier of the entire real property. However, the master key is a pictorial code such as a bar code, a QR code, or a unique image in another embodiment. The master key advantageously provides a convenient, accurate, uniform, and shorthand way of referring to a parcel of real property.

The system is preferably operable to retrieve all documents, titles, and permissions associated with the master key in the system for managing real estate titles and permissions. Preferably, this includes the chain of ownership for titles and/or permissions. This provides an improvement over the prior art by providing a centralized database for all relevant records associated with the real property. Preferably, the master key is associated with at least one IP address defining a geofence which defines real property. In another embodiment, the master key is associated with a plurality of longitudinal and latitudinal points. In another embodiment, the master key is associated with at least one geographic designator as described in U.S. application Ser. Nos. 14/728, 259, 14/745,951, 14/755,669 and 14/740,557. In one embodiment, the master key is encrypted within the system. Encryption in one embodiment means that the master key is not displayed to users in the real estate titles and permissions platform or database. In another embodiment, encryption means that the master key is only displayed to authorized users of the real estate titles and permissions platform or database. In another embodiment, the real property is identifiable and searchable using the master key. That is, the master key functions as an identifier of the real property.

In one embodiment of the present invention, each of the titles and/or permissions associated with the real property includes at least one slave key. The slave key is preferably unique to each title and/or permission associated with the real property. Preferably, the slave key is transferable between parties, and represents the title and/or permission. The slave key is encrypted in one embodiment of the present invention. In another embodiment, the owner associated with the slave key is encrypted. In yet another embodiment, the slave key and/or owner is hidden. The slave key is also operable to be transferred or duplicated electronically. Preferably, the slave key which is duplicated or transferred is sent to at least one electronic device. The slave key is operable to enable the at least one electronic device to perform functions within the real property boundaries. In another embodiment, the slave key is operable to disable the at least one electronic device from performing functions within the real property boundaries.

Preferably, the database of the present invention includes historical files associated with the real property, easements on the real property, titles associated with the real property, permissions associated with the real property, prohibitions associated with the real property, probate documents, and other critical documents associated with the real property. In one embodiment, each of these documents is tagged with the master key. Prohibitions include an ownership, rental, or lease right to prevent activity on real property. Prohibitions can include blocking phones from making calls, accessing data, or recording data on real property. Prohibitions are temporary in one embodiment. In another embodiment, prohibitions are permanent. Preferably each of these documents includes time stamps, file types, and other kinds of search keys. These documents are preferably retrievable via a search engine. The search engine is operable to search by master key, geographic designators, an owner, a leaser, a renter, a past owner, easement holders, permission holders, prohibitive rights holders, etc.

In another embodiment of the present invention, the real estate titles and permission platform is operable to facilitate a creation, transfer, or division of title and/or permission. The creation, transfer, or division of title and/or permission is preferably performed using the master key. In one embodiment, the creation, transfer, or division of title and/or permission is performed by sending the master key to an electronic device. Upon crossing a boundary of the real property, the device is recognized to contain the master key and is granted the benefits associated with the title and/or permission within the real property boundaries. In another embodiment, the creation, transfer, or division of title and/or permission is performed by sending the slave key to an electronic device. In one embodiment, a localized server, router, or computer recognizes that the device contains the master key or slave key or fails to contain the master key or a slave key. In another embodiment, the existence, creation, transfer, or division of title and/or permission is encrypted or hidden. In yet another embodiment, the ownership of the title and/or permission is encrypted. Preferably, the existence of the title and/or permission is not encrypted if the ownership of the title and/or permission is encrypted.

In an exemplary embodiment, the database of the present invention also includes a commerce platform. Preferably, owners of titles and/or permissions can register financial accounts with the commerce platform. Third parties having no ownership interest in titles and/or permissions can also preferably register financial accounts with the platform. The commerce platform is operable to perform transactions among financial accounts registered with the platform. The commerce platform is also preferable to perform transactions between financial accounts registered with the platform and accounts belonging to third parties. In one embodiment, the commerce platform is operable to perform an encrypted financial transaction, where at least one of the parties to the transaction, the amount of the transaction, and the subject of the transaction is unknown. One method of performing an encrypted financial transaction is using Bitcoin. Bitcoin utilizes an implementation of a block chain, a distributed database that maintains a continuously growing list of data records that are hardened against tampering and revision, even by operators of the data store's nodes.

Block chain technology can also be used in the present invention to perform financial transactions. In another embodiment, block chain technology can be used in the present invention for a database, a platform, or a commerce system having the chain of ownership, permissions, prohibitions, rentals, leases, duplications, etc. Core advantages of block chain architecture include the following. The ability for a large number of nodes to converge on a single consensus of the most up-to-date version of a large data set such as a ledger, even when the nodes are run anonymously, have poor connectivity with one another, and whose operators could be dishonest. The ability for any node that is well-connected to other nodes to determine, with a reasonable level of certainty, whether a transaction does or does not exist in the confirmed data set. The ability for any node that creates a transaction to, after a certain period of confirmation time, determine with a reasonable level of certainty whether the transaction is valid, able to take place, and became final (i.e. that there were no conflicting transactions confirmed into the block chain elsewhere that would make the transaction invalid, such as the same currency units "double-spent" somewhere else). A prohibitively high cost to attempt to rewrite or alter any transaction history. An automated form of resolution that ensures that conflicting transactions (such as two or more attempts to spend the same balance in different places) never become part of the confirmed data set. A block chain implementation consists of two kinds of records: transactions and blocks. Transactions are the actual data to be stored in the block chain, and blocks are records that confirm when and in what sequence certain transactions became journaled as a part of the block chain database. Transactions are created by participants using the system in the normal course of business (in the case of cryptocurrencies, a transaction is created anytime someone sends cryptocurrency to another), and blocks are created by users known as "miners" who use specialized software or equipment designed specifically to create blocks. Users of the system create transactions which are loosely passed around from node to node on a best-effort basis. The definition of what constitutes a valid transaction is based on the system implementing the block chain. In most cryptocurrency applications, a valid transaction is one that is properly digitally signed, spends currency units from a known valid wallet, and meets various other requirements such as including a sufficient miner "fee" and/or a certain time elapsed since the currency units were previously involved in a transaction. Meanwhile, miners attempt to create blocks that confirm and incorporate those transactions into the block chain. In a cryptocurrency system such as bitcoin, miners are incentivized to create blocks in order to collect two types of rewards: a pre-defined per-block award, and fees offered within the transactions themselves, payable to any miner who successfully confirms the transaction.

Relationships are also enabled in the virtual space between real property, geofences, electronic devices, owners of permissions, owners of title, owners of leases, renters of permissions, owners of prohibitions, renters of prohibitions, etc.

The present invention is useful in a variety of industries for a variety of purposes, but is particularly useful in relation to virtual rights and the oil and gas industry. Currently, oil and gas companies spend a lot of time trying to determine who to lease rights from and the distribution of revenue and compensation to parties with rights to revenue and compensation from exploration, extraction, and other activities performed on the real property. Specifically, oil companies determine who owns the mineral rights by a title search, which can be very complex due to years of probates and subdivisions of mineral interests. The oil company makes a lease with every owner of mineral interests, typically for a 3 year primary term. For production found, the area around the well is unitized and the revenue is owned by the oil company subject to the complex payments of royalty interests to the appropriate parties. The land which is not unitized by the end of the 3 year primary term is released unless the oil company maintains a minimum continuous drilling requirement. The oil company must make a deal with the surface estate owner, who is sometimes not an owner of the mineral rights. The entire system just described can be "flattened" with a virtual platform and commerce platform as described herein. Specifically, this entails using the developed fences or geofences around the units and production areas as well as assigning classes and entitlements to fences or geofences and those who perform activities in the fences or geofences as described in U.S. application Ser. Nos. 14/728,259, 14/745,951, 14/755,669 and 14/740,557. Different relationships can be combined into a set of fences which express each title relative to their physical boundaries with solid tags to the related instruments. By way of example, surface title can have a solid tag to related agreements and are developed into a set of fences, mineral titles can have a solid tag to related instruments and are developed into a set of fences, virtual wireless relationships (validated and unvalidated) are developed into a set of fences, and air rights (validated and unvalidated, virtual and non-virtual) are developed into a set of fences. When revenue is produced, a division order is filed with the appropriate government entities which states the owners, their percentage of interest or amount of interest in the minerals, and any royalties that must be paid. Once an oil company terminates a lease, the information contained in the division order is typically lost or inconvenient to access. If a new company wishes to lease or buy rights associated with the real property, the new company will typically be required to begin the process of determining the distribution of revenue, royalties, and compensation from scratch. The present invention simplifies this process by retaining the records associated with all of the relevant parties and providing the commerce platform for paying the appropriate amounts of compensation, royalties, revenues, etc. to the relevant parties. Preferably, the payment is entirely virtual and automated. An example of a list of relevant parties includes the oil company owning a well, owners of leases on the surface land, overriding royalty owners who are not owners of mineral rights, mineral rights owners based upon their percentage under the surface, surface owners having contracts with the oil company to clean up.

Another exemplary embodiment includes the situation in which there are undivided mineral interests in two adjoining properties. If a well is drilled on a "virtual mineral rights fence line" between two properties, the oil company which drills the well must pay the owners of the mineral rights of both properties as the oil company is considered to be draining both mineral estates. In one aspect, the present invention provides for a method and system to dynamically manage electronic payment and percentages to all parties who must be compensated or reimbursed for the drilling. For example, the undivided mineral interests in the two properties, the oil well which drains, two leases owned by different oil companies, and a potential surface owner who doesn't have mineral rights but has a surface clean up contract can all be compensated or reimbursed under the present invention.

For the situation in which mineral owners own an undivided interest in an area with many others (potentially hundreds or even thousands of others), the present invention simplifies the ownership of interests in the area using an encrypted title key. The encrypted title key points to the owners and their relationships to the whole area. In one embodiment, the key provides the core mechanism of title ownership and title type (such as mineral interest and surface interest). The key and system preferably provide for a dynamic electronic payment system which would be administered through the banking system, a virtual currency system, or any other type of payment system. In the context of oil and gas rights, the surface owner usually has less than 100% ownership of the minerals. In most cases, the surface owner will not profit from the production of oil, gas, or any other minerals on his lands, but is entitled to damages caused by exploration and harvest of the oil, gas, or other minerals. While the underlying fence is the same for oil, gas, and mineral rights as it is for surface rights to a property, the owners are often different and thus it is advantageous to provide a title system which is normalized with owner key encryption in which payment could be virtual and automated.

In one embodiment, the present invention comprises a network and computer-based system in data communication with title companies and/or the public system of real property records across the world that provides the "grant" of an area or fence as recorded metes and bounds of any piece of real estate. This "area" may be associated with an encrypted master software key which is at least initially owned by the title owner of record of the real estate, but can be sold, leased and marketed separately in the system as provided today and filed of record in the proper jurisdictions according to established laws or laws that may be established in the future. In another embodiment, the present invention includes a network and computer-based system in data communication with a geofence registry or geofence database. Exemplary geofence registries and databases are described in U.S. application Ser. No. 14/728,259.

In one embodiment, the title and ownership of this new property right is not recorded formally as the adoption of this into local laws as it applies to real estate may evolve as will the market of this "virtual asset." In one embodiment, there is one owner and one name associated with each encrypted master key. In this case, the owner of this asset owns an area (or volume) of real estate. This real estate area and respective encrypted keys are preferably operable to be marketed to third parties in the form of a lease or outright sale. In one embodiment, there is one master key per area that is unlocked by the slave software key dynamically when the device moves into the "virtually" fenced area.

The system requires that all devices have a "key" and that to render a particular device functional inside any "defended or fenced space" the key be installed and functioning to a (standard) specification in one embodiment of the present invention. Upon entering the defensible space, the device in communication the encrypted "fence space" automatically unlocks the device under one application shell for the purposes of managed commerce while inside the owned virtual area. GPS or other positioning means and network functionality are operable to be disabled for the purposes of custom application software that may be tailored to events and other types of commerce as scheduled through an online network portal system functioning inside the "fenced" space. Devices (or particular applications on a device) without the key application are also operable to be selectively disabled. In another embodiment, devices or particular applications on a device are operable to be automatically disabled upon the device entering the boundaries of the fenced space.

Preferably, permissions or prohibitions are adjustable in real-time or near real-time. For example, permissions or prohibitions can be expanded, limited, revoked, or put into effect in real-time or near real-time when the device is outside the real property or inside the real property.

An example of automatically or selectively disabling devices within the boundaries of a fenced space includes disabling a device in a movie theater, a portion of the movie theater, or upon certain actions within the movie theater. Patrons using their devices during the showing of a movie can distract other audience members. Therefore, the present invention provides for automatically disabling functioning of electronic devices within individual theaters. In another embodiment, the present invention provides for selectively disabling functioning of electronic devices within individual theaters. Disabling of the device is based on a device user using the device in an individual theater for more than a predetermined time period in one embodiment. In another embodiment, disabling of the device is selective according to an owner or operator of the movie theater.

Another embodiment of the present invention provides for issuing safety warnings to a device within a certain proximity of a safety hazard on the real property.

Another embodiment of the present invention provides for issuing a warning to unauthorized devices or users to get off property when the device enters the property. Preferably, the warning includes a warning to get off the property within a certain time period. In one embodiment, law enforcement is notified upon the issuance of the warning. In another embodiment, law enforcement is notified upon the expiration of a certain time period. The warning is restricted to devices within a predetermined area of the real property in one embodiment. An example of this embodiment includes a user of a device entering an unauthorized area of a public park, for example a maintenance building. The device receives a warning indicating that the user of the device should get out of the maintenance building within 2 minutes or law enforcement will be notified. This embodiment of the present invention aids in deterring trespassers. In another embodiment, no warning is issued to the device and law enforcement is notified within a predetermined time period that there is an unauthorized person/device in the boundaries of an area. The law enforcement may be notified immediately upon the device entering the boundary.

Some or all applications which are running and utilize the location hardware in communication with the data or telecommunications network are operable to be rendered inoperable as part of the core code in the encryption system as provided within the network.

In another aspect of the invention, the same system is operable to be created and managed in areas that may not have encrypted keys assigned to a specific space and may be designated public spaces and open for (online) rental or purchase. These areas are operable to be rented or leased through the online portal and the respective commerce managed by the "online squatter." In one embodiment, all devices inside these public areas, when entering into these public areas, become the target of the owner of the area via the terms established through an online bidding process and regular payments.

In another aspect of the present invention, the owner of a "virtual venue" can automatically trigger application software and content within the confines of the venue based upon an online event schedule. For instance, the venue owner can bring third party content to the devices inside the geo-referenced fence at defined dates and times dynamically.

In another aspect of the present invention, the structure of the software and network system serves as a "master shell" in which managed key application software to push critical content to devices based upon "where" they are inside the geo-referenced "fenced area." For example, within a shopping mall, there are typically many different retailers. The content pushed to devices can depend upon the device being within a certain proximity of a retailer, closest to a retailer, or inside the physical boundaries controlled by the retailer. Within the individual retailer, content can be pushed based upon the product or services area where the device is located. For example, content relating to jeans can be pushed to the device if the device is within a predetermined proximity of the jeans section of the retailer. Content relating to perfume can be pushed to the device if the device is within a predetermined proximity of the perfume section of the retailer. Access to content can similarly be restricted. Access to the content includes access to the content over a network such as the Internet or a cell phone network in one embodiment. In another embodiment, access to content includes access to content locally stored on the device (i.e. stored in the memory of the device).

One example of the operation of a key providing permissions on real property is drone delivery. An owner of the surface rights to a property owns the drone title to the property by default in one embodiment. In another embodiment, the drone rights to a property are separate rights from the surface rights and can be leased, transferred, rented, or sold. This could advantageously provide a location for drones to take a "break" on deliveries to cool off hardware, to refuel, or make an emergency landing in order to be picked up or serviced.

However, the owner of the surface rights of real property could also have an interest in receiving deliveries from drones or drones landing for pickups of packages or mail. Permissions in these circumstances can include (1) the right to enter the boundaries of the real property and (2) the right to movement within the boundaries of the real property. These permissions can be accomplished via at least one virtual key between drones and the owner of the drone rights. Preferably, these keys are encrypted so as to prevent unauthorized parties or drones from using the key to obtain permissions with respect to the real property that are not authorized by the owner of the drone rights of the real property. The at least one virtual key can be passed between the owner of the drone rights and the drone or an authorized third party controlling the drone at the time of purchase of an item or the time of request for a pickup of a package or mail. The at least one virtual key can also be passed at a time before any purchases or requests have been made. The at least one virtual key grants rights in perpetuity in one embodiment. In another embodiment, the at least one virtual key grants temporary rights within a certain time period (i.e., during a certain month, week, day, hour, or other predetermined time frame such as between 1:00 PM and 5:00 PM on Nov. 12, 2015). The at least one virtual key grants the right to a predetermined path of movement within the real property in one embodiment. In another embodiment, the at least one virtual key grants the right to a predetermined landing point, regardless of movement within the real property. In yet another embodiment, the at least one virtual key grants the right for a drone to fly over the real property. In a further embodiment, the at least one virtual key grants the right to deliver a package or mail and leave. In yet another embodiment, the at least one virtual key grants the right to drop a package without landing. In another embodiment, the at least one virtual key requires that the drone stay on the real property until receiving confirmation that the package or mail has been delivered. The confirmation could be a person removing the package or mail from the drone. A code is required to remove or "unlock" the package or mail from the drone in one embodiment. The confirmation could also be a person pressing a confirmation button on the drone. The at least one virtual key includes varying instructions for delivery based on weather, time of day, temperature, and package type in another embodiment. Preferably, the rights to movement and landing within the boundaries of the real property are defined within feet. Even more preferably, the rights to movement and landing within the boundaries of the real property are defined within inches. Even more preferably, the rights to movement and landing within the boundaries of the real property are defined within millimeters. Even more preferably, the rights to movement and landing within the boundaries of the real property are defined within microns. The systems and methods described in U.S. application Ser. Nos. 14/728,259, 14/745,951, 14/755,669 and 14/740,557 for defining boundaries of geofences are all applicable to define the rights of drones with respect to real property.

One embodiment of the present invention generally relates to mobile electronic devices. More particularly, it relates to the use of mobile electronic devices having location sensors and wireless communications capabilities in advertising and promotions.

A geo-fence is a virtual perimeter for a real-world geographic area. A geo-fence may be dynamically generated-as, for example, a radius around a store or point location. Or a geo-fence may be a predefined set of boundaries, for example, school attendance zones or neighborhood boundaries. Custom-digitized geo-fences have been in use for multiple online mapping applications since at least 2004.

When the location-aware device of a location-based service (LBS) user enters or exits a geo-fence, the device receives a generated notification. This notification may contain information about the location of the device. The geo-fence notice may be sent to a mobile telephone or an email account.

Geo-fencing, used with child location services, may notify parents if a child leaves a designated area. Geo-fencing is a critical element to telematics hardware and software. It allows users of the system to draw zones around places of work, customer's sites and secure areas. These geo-fences, when crossed by an equipped vehicle or person, may trigger a warning to the user or operator via SMS, e-mail or other communication means. Other applications include sending an alert if a vehicle is stolen and notifying rangers when wildlife stray into farmland.

Geo-fencing, in a security strategy model, may provide security to wireless local area networks. This may be done by using predefined borders, e.g., an office space with borders established by positioning technology attached to a specially programmed server. The office space becomes an authorized location for designated users and wireless mobile devices.

The increasing popularity of mobile advertising has led to geo-fencing being used to distribute location-specific ads to potential customers on their mobile electronic devices.

Large scale entertainment events such as concerts offer excellent opportunities for new and creative promotional activities. These opportunities have been substantially broadened by the proliferation of personal electronic devices such as cell phones and tablets due to their constant connectivity, position tracking, and versatility. There is a pressing need to develop systems for incorporating these modern electronic devices into promotional activities during large scale entertainment events.

It is well understood that electronic media devices may receive text, pictures, and sound from other sources via radio waves, Bluetooth technology, or other transmission mediums. These text, pictures, and sounds may be sent to media devices as part of a promotional activity. Another technology commonly used in the industry is sending electronic coupons and/or encrypted barcodes signifying that the user has purchased some item or performed some task to electronic media devices through radio frequency, Bluetooth, or other transmission mediums. After the barcode is received, the user may redeem the item keyed to that unique barcode at a designated location. However, the circumstances under which customers receive such text, pictures, sound, and barcodes are limited.

One potential avenue to expand the circumstances under which customers receive text, picture, sound, or barcode is utilizing the accelerometer feature common in many mobile electronic devices. The accelerometer measures movement of the device. These measurements may be used as stimuli for applications on the device to perform additional tasks such as communicating with other nearby devices by radio waves, Bluetooth, or other transmission mediums. Systems may be developed to incorporate accelerometer measurements, location determinations, and media device connectivity into promotional systems.

Yet another application relates to geo fencing technology. Users that have signed up for a promotion and enter a venue where that promotion is taking place (e.g., identified by a geo-fence configured by the promotion organizer) may become eligible to receive promotional materials via text, pictures, sound, barcodes, links, etc. Using these background parameters such as geo-fencing, location sensors, accelerometer readings, and information transfer capabilities, electronic media devices may be incorporated into a variety of novel circumstances from large scale promotional activities to treasure hunts.

One embodiment of the present invention provides a means for a customer to record a user's contact information, location or other such user-specific information during an event using an application for an electronic media device. For example, a sudden jolt registered by the accelerometer of a mobile electronic device, and/or the user's location based on locations sensors (e.g., a GPS receiver) may be used to trigger the sending of information concerning the user. In return, the user may receive any combination of text, pictures, sounds, or encrypted barcode, all of which may be customized by the customer. Additionally, to create more engaging promotions, systems may be configured to use dynamic geo-fencing, so that moving geolocations may be used, or different geolocations may be set to be included in a game for instance, or the size of a virtual geo-fence area may be expanded or contracted depending on activity in game. In a large entertainment venue, geo-fencing may be used in association with a spotlight, or camera to include in a certain promotion fans that are in the spotlight or in the field of view of the camera.

The invention may best be understood by reference to the exemplary embodiment(s) illustrated in the drawing figure wherein the following reference numbers are used:
- 2 sudden jolt or impact
- 4 portable electronic media device
- 6 backend server
- 8 accelerometer One embodiment of the present invention comprises a system for exchanging user contact information for redeemable barcodes, e-coupons, or other material during a promotion using a mobile computing device, herein referred to as a media device. The system provides for a distributed application (mobile app), which may be downloaded as a set of instructions with independent, but connected processing intelligence, and location information, such as GPS coordinates, which may, in part, be used to control when the media device is eligible to receive a transmitted promotion. Examples of portable electronic media devices include mobile smart phones, tablet computers (e.g., the Apple iPad), media players and other such processor-based, portable devices having wireless communications capability, utilize position sensors, and contain accelerometers. As used herein, the term GPS is intended to include all Global Navigation Satellite Systems (GNSS) including, but not limited to, the U.S. Global Positioning System, the Russian Global Navigation Satellite System (GLONASS), the planned European Union Galileo positioning system, India's Indian Regional Navigation Satellite System, and the Chinese Beidou Navigation Satellite System.

FIG. 1 is a schematic illustration of one system according to an embodiment of the invention. In FIG. 1, any portable electronic media device 4 equipped with an accelerometer 8 and/or location sensors, and the application program that accompanies this system may be used. Any sudden jolt or impact 2 to the portable electronic media device 4 may be registered by the accelerometer 8. A back end server 6 is where the customer may store information related to a particular promotion including but not limited to text, sound, pictures, electronic coupons or barcodes to be sent to a target user of the promotion. Back end server 6 may also be where the potential targeted users register for a campaign using an application on their electronic media device 4 which application may be a free, downloadable application.

In an embodiment, a customer of the promotion system registers through a web-enabled interface to a back end server 6 that they wish to hold a promotion. In a preferred embodiment, that customer will set the location of the event using, for example, a GPS-based mapping program and set a distance from that location where users may take advantage of the promotion. The customer may create a perimeter area, a geo-fence, which may be used to identify users participating in the promotional event. The size and location of the geo-fence may be completely customizable by the customer through the mobile app interface. In one completion, the geo-fence may be drawn very large such as encompassing an entire music festival, concert, or any large scale entertainment event. In another instance, the geo-fence may be drawn very small encompassing only one store or even a certain portion of a store. The customizability of the geo-fence utilized in this invention is only limited by the accuracy of the mobile device's positioning technology. Other techniques include users signaling when they have arrived at the event. The customer may also schedule duration for the promotion by time and date. The scheduling input by the customer may be done through the mobile app. Therefore, the customer may set up time, date, and geo-fence restrictions for a promotion on the back end server 6.

For this service, the customer may be charged an hourly rate based on the expected length of the promotion, may potentially be charged by expected number of promotion target users, or may be charged by the size of the geo-fence. Those skilled in the art will recognize a wide variety of payment systems applicable to this invention, all of which are incorporated.

Additionally, the customer may use the app itself to create a promotional event. In one particular preferred embodiment, the customer may create a treasure or scavenger hunt utilizing the location and direction capabilities of many media devices. In this embodiment, many users may log into the mobile app simultaneously to participate in a treasure hunt type event. The customer may send users various pieces of information by text, picture, or sound based upon that user's location and direction in relation to some end location or "treasure." This process may be completely automated on the back end server 6 based upon customizable parameters set up by the customer. In another embodiment, the customer may set up checkpoints by drawing multiple small geo-fences for a scavenger hunt where users complete each checkpoint by taking a picture there, scanning a barcode, shaking the mobile device at the proper location, simply arriving in the geo-fence area, or any other mobile device activity. In yet another embodiment, the media device screen may change color based upon the location of the user and their distance away from and trajectory towards some set end point. As the user moves closer to the end point, the screen may change from red to green or offer a textual indicator to the user such as "you're getting hot" or "you're getting colder." Furthermore, the screen may change color based upon the direction the media device 4 is pointing. It is contemplated that this invention may be used in a multitude of ways where stimuli from the user result in an automated response from the back end server 6 through the mobile app where the response and proper stimuli are completely customizable by the customer.

To participate in a promotion, a potential promotion target (user) downloads an application program (app) according to the invention onto media device 4. After downloading, the user may register using the app to enter his or her contact information into an interface provided by the app. Later, in a preferred embodiment, the app automatically arms the device when the user enters the GPS-defined perimeter or geo-fence set by the customer for the duration of the promotion. This app may use the bump API to register media device 4 in response to impact 2 which works using the accelerometer 8 found in most modern media devices. In a preferred embodiment, upon an abrupt jolt 2 of the media device, the app promptly registers that that user may now be eligible for whatever promotion reward there may. In one preferred embodiment, once a user enters the geo-fence the app automatically supplies the customer with a clue to lead them to a subsequent checkpoint as part of a scavenger hunt. In an embodiment, each subsequent checkpoint may be marked by another geo-fence ensuring the customer that the user has actually found all required checkpoints. Further, the app may be programmed to only send the user a subsequent clue for the location of the next checkpoint upon entering the geo-fence drawn around the current checkpoint and performing some task such as taking a picture, shaking the device, or scanning a barcode.

The abrupt jolt 2 registered by the accelerometer 8 that triggers a response from the back end server 6 as part of this invention may be the consequence of the device striking any object or striking an object equipped with technology capable of communicating with the media device 4. In one embodiment, the customer may circulate customizable beach balls common in large entertainment events. A user may strike the beach ball with their media device 4 to generate the jolt. Further, that beach ball may be equipped with technology that communicates with the media device 4 at impact 2 to insure the user has struck the ball e.g., using a near field communication (NFC) link. This communication may also be through Bluetooth, radio signal, or other communication mediums. One skilled in the art may conceptualize many different processes where the user jolts their media device against another object resulting in communication between the two. Therefore, this invention is not limited to the beach ball embodiment. Subsequent to the bump, the user's eligibility may sent to the customer through the back end server 6.

If the user is selected to receive a promotion through use of selection criteria on the back end server 6 (criteria that may be programmed or input by the customer), the back end server 6 may send the user's media device an automatically-generated message containing information. The information may include but is not limited to one or any combination of text, pictures, sounds, e-coupons or barcodes. This information may be entirely customizable by the customer and may include that a certain percentage of users who bump media devices receive different information than others. In one embodiment, only a certain percentage of users who bump media devices receive a barcode which signifies they are eligible to receive a prize. The percentage of prize-winning users or the prizes themselves may be variable and completely at the discretion of the customer.

In yet another preferred embodiment, a user's eligibility for a particular promotion may be established by simply being within the geo-fenced area selected by the customer. In this embodiment, a user's eligibility for a promotion may be determined automatically using the location determination capability of that customer's mobile device 4. No additional action by the user may be required to render them eligible for the promotion.

Figure 2:
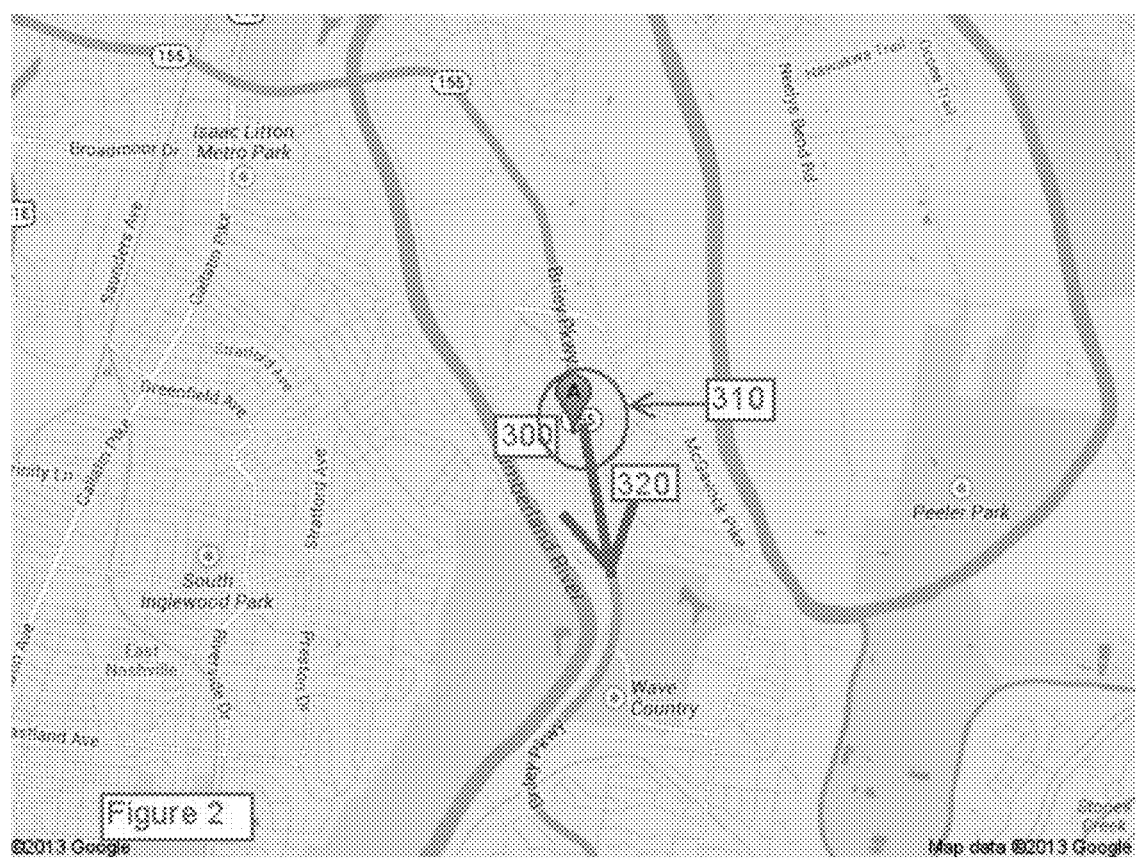
FIG. 2 is a map showing a moveable geo-fence.

Geo-fencing may be used dynamically to increase the interest of those participating in a game or promotion. The invention adds a motion component to a geo-fence or a vector with an area. The system permits the planner of a promotion to pre-draw the path vectors for the geo-fence. So, the promotion planner may create a geo-fence area on a displayed map, and then create a path or vector on the map over which the center of the geo-fence will traverse. Adding a vector through a user interface is illustrated in FIG. 2. In the illustrated example, a user places a mouse or other pointing device at the location of the Ryman Auditorium 300 (home of the Grand Ole Opry weekly stage concert) on Briley Parkway in Nashville, Tenn., and then draws a vector, 320, directed south along Briley Parkway so that geo-fence area 310 will move south centered on the vector. The purpose of the geo-fence may be to identify mobile devices that are eligible to participate in the game or promotion as a result of being near, in, or out of the geo-fenced area. The system allows the promotion planner to set parameters when the size of the geo-fence would be recalibrated to potentially reduce the number of devices that are participating, changing the direction of the geo-fence dynamically based upon the parameters set by the promotion or game planner.

The parameters of when to move, resize, or otherwise adjust the geo-fence or geo-fences may be preprogrammed in a set game format, or open for selection by a promotion planner. The options on when and how a geo-fence may move, be resized, intersect, and/or encroached upon as competitive control of a specific geographic or virtual space including 2-d, 3-d or planar 3-d space may include, but not limited to, the following:

1. The interaction of the users (devices) in or near the geo-fence.
2. A preset time to designated spots along a preset path along the vector.
3. A count of eligible mobile devices in a particular area.
4. The initiation of an event at a pre-designated location.
5. Interaction between one or more groups of devices within multiple geo-fences based upon game or promoter parameters.
6. Satellite mapping of the movement of an object such as a boat or ship.
7. A 3-d grouping of mobile devices which are targeted by generating display information in real-time and in communication with these devices for visual control, notification, and other multimedia interaction as a pixel in a larger viewing arena.
8. A heat map calibration of devices participating in any game logic in communication with a central or distributed processing network that may comprise a collective of game logic and social interaction and human interface.

A game or promotion may include focusing a geo-fence around one or a cluster of players who for some reason are winning or are exceeding certain criteria. By doing this, current devices that are playing or part of the promotion may be left out or removed from the group. Players or eligible devices may, likewise, be added or substituted. Another example is a game or promotion similar to the game Capture the Flag. The geo-fence may be "won" by holding it by a group of players who either gain positions inside geo-fences or interact in some way, including with the promotions servers, to meet defined criteria. Rewards may be provided for such play. The geo-fences involved in the game may be set across the country or the world, or within a single venue such as a soccer stadium.

Rather than having the geo-fence predefined, in a venue like a concert or ball game, a form of geo-fence may be created on the fly through calibration of the coverage of the outline of a concert spotlight as it moves across crowds as to a projected elliptical area in real time from its 3-d location in a venue. The light may be detected by one or more sensors (e.g., infrared sensors) on the users' devices or other electromagnetic radiation sensors. Such area may be translated into the geo-fence area for purposes of recognizing mobile devices in this area dynamically. The same concept may be useful as well in translating a geo-fence area into the system as converted using the area which may be captured from a camera view for the purpose of polling by geo-fencing mobile devices within this area. Said area as the camera moves may be recalibrated to incorporate the changes in what may captured. In a particular viewing area, the eligible devices may be provided images or other data to display on the screen to create a larger display. Or clothing, accessories, or other devices that are in communication with the mobile device through a communication protocol such as Bluetooth may be illuminated in some specific way.

The displayed designs may be pre-programmed or set on the fly by a director on site. In certain embodiments, the system may be implemented using remotely controlled cameras or by selecting a smaller field of view in a wide angle digital camera.

Under certain gaming parameters, mobile devices may take control of adding vectors to the actual fence and direct its movement under certain conditions. For instance, if certain criteria are met, a player may expand their geo-fence area to incorporate additional team members. Additionally, the back end servers may issue commands to create vectors, either based on preset logic or on-the-fly under the direction of a promotion or game planner. The geo-fences of this system may be three dimensional—i.e., have an altitude component and/or x-, y-, and z-axis limits.

In certain games, actions by players in a particular geo-fenced area may be used. For instance, the number of players in a geo-fenced area that solve a puzzle, or simultaneously take action in some way, may cause a virtual missile or other virtual weapon to be fired at another geo-fenced area. Those players may defend or counter attack using similar actions.

In certain embodiments of the invention, a secure encryption system may be used to incorporate the metes-and-bounds legal title of real property into a separate estate and title system for the ownership and control of a virtual network space.

Ownership interests in real property are commonly defined by geographic boundaries ("metes and bounds"). Cadastral surveys document the boundaries of land ownership by the production of documents, diagrams, sketches, plats, charts, and maps. Cadastral survey information is often a base element in Geographic/Land Information systems used to assess and manage land and infrastructure. The Public Lands Survey System is a cadastral survey of the United States originating in legislation from 1785, after international recognition of the United States. The Dominion Land Survey is a similar cadastral survey conducted in Western Canada begun in 1871 after the creation of the Dominion of Canada in 1867. Both cadastral surveys are made relative to principal meridian and baselines. These cadastral surveys divided the surveyed areas into townships, square land areas of approximately 36 square miles (six miles by six miles; some very early surveys in Ohio created 25 square mile townships when the design of the system was being explored). These townships are divided into sections, each approximately one mile square. Unlike in Europe this cadastral survey largely preceded settlement and as a result greatly influenced settlement patterns. Properties are generally rectangular, boundary lines often run on cardinal bearings, and parcel dimensions are often in fractions, or multiples of, chains. Land descriptions in Western North America are principally based on these land surveys.

Current real estate ownership and the title to real property has as its basis metes and bounds or area. The title of real estate is customarily insured when it is purchased. In certain jurisdictions, there is a separate "mineral" estate that can be sold or leased separately from the surface estate. In oil and gas exploration, it is customary to lease minerals from different owners than those who own the surface of the land. It is also possible to lease or purchase the mineral rights to different strata for certain formations at certain depths. These different "strata" may have different intrinsic market values and hence may be segmented as such for marketing purposes.

Today, the widespread personal possession of mobile computing devices and their near-constant connectivity with data and telecommunications networks, coupled with very accurate GPS and network triangulation location calculators have created a critical problem for owners of real estate. As an example, a retail mall generally is a business where the owner of the "real estate" (landlord) rents space to store owners who sell goods to customers who physically come to shop. These retail businesses count on the landlord of the mall to provide the necessary conditions for shopping. Some of these include the provision of heating and air conditioning, security services, ample parking and a varied selection of stores for shoppers to choose from. The landlord depends upon the shoppers to purchase from the merchants and the merchants to therefore be successful and able to pay their rent. Concerts, tradeshows, and sporting events are additional examples where the real estate and its owner are the basis behind the commerce within the metes and bounds as set forth in title and "owned."

Another example of the commerce and the ownership of "air" or virtual space was made famous by Donald Trump. He made a successful business through the purchase of the "air space" above buildings for future development in New York City. It was legally determined that owners of land could sell the air rights above these lands for future development to Trump. Hence, title companies recognized this "air space" as an interest in real estate that can be marketed and sold. Although perhaps less tangible than minerals, owning a mineral estate does not guarantee the discovery or production of them in commercial quantities.

The problem is that other companies or individuals can effectively pirate the virtual real estate and related commerce using software which is currently standard, free code provided by publically-available programs to draw geo-referenced "fences" on electronic maps (e.g., "Google Maps"). Using such graphics together with code that is on the processor-based device (e.g., a smartphone or tablet computer), companies in control of the devices are able to create an intrusive connection with their customer while he or she is inside the "envelope" of the real estate owner's property. This intrusion may be disruptive to the business activities and personal "space" of the "owner." This aspect of the present invention provides a method for "locking the (virtual) doors" of homes, venues, and other commercial real estate.

This aspect of the present invention comprises a secure encryption system to incorporate the Cadastral Descriptions and respective owners of the title of real estate including the ownership and management of virtual space over said areas for wireless processor-based devices which enter said areas as a separate estate or an estate "running with the land" for related personal control and contractual business services.

Fundamental to this optional aspect of the present invention is the fact that the owners of real property have the right to control that real estate and the activities of those who venture inside the metes and bounds of these spaces. The present invention extends this concept to all network-enabled, portable, processor-based, electronic devices.

This aspect of the invention comprises a network and computer-based system that may be in data communication with title companies and/or the public system of real property records across the world that provides the "grant" of an area or fence as recorded metes and bounds of any piece of real estate. This "area" may be associated with an encrypted master software key which is at least initially owned by the title owner of record of the real estate, but can be sold, leased and marketed separately in the system as provided today and filed of record in the proper jurisdictions according to established laws or laws that may be established in the future.

In one embodiment, the title and ownership of this new property right may not be recorded formally as the adoption of this into local laws as it applies to real estate may evolve as will the market of this "virtual asset". The present invention is in some ways analogous to the domain name (or "internet name") ownership market. There is one owner and one name associated with each encrypted master key. In this case, the owner of this asset owns an area (or volume) of real estate. This real estate area and respective encrypted keys may be marketed to third parties in the form of a lease or outright sale. There may be one master key per area that may be unlocked by the slave software key dynamically when the device moves into the "virtually" fenced area.

The system may require that all devices have a "key" and that to render a particular device functional inside any "defended or fenced space" the key be installed and functioning to a (standard) specification. Upon entering the defensible space, the device in communication the encrypted "fence space" may automatically unlock the device under one application shell for the purposes of managed commerce while inside the owned virtual area. GPS or other positioning means and network functionality may be disabled for the purposes of custom application software that may be tailored to events and other types of commerce as scheduled through an online network portal system functioning inside the "fenced" space. Devices (or particular applications on a device) without the key application may be selectively disabled.

Some or all applications which are running and utilize the location hardware in communication with the data or telecommunications network may be rendered inoperable as part of the core code in the encryption system as provided within the network.

One aspect of the present invention ties the metes and bounds and respective geographic data to an encrypted key using software and online management through network computing devices.

In another aspect of the invention, the same system may be created and managed in areas that may not have encrypted keys assigned to a specific space and may be designated public spaces and open for (online) rental or purchase. These areas may be rented or leased through the online portal and the respective commerce managed by the "online squatter." All devices inside these public areas may, when entering into these public areas, become the target of the owner of the area via the terms established through an online bidding process and regular payments.

In another aspect of the present invention, the owner of a "virtual venue" may automatically trigger application software and content within the confines of the venue based upon an online event schedule. For instance, the venue owner may bring third party content to the devices inside the geo-referenced fence at defined dates and times dynamically.

In another aspect of the present invention, the structure of the software and network system may serve as a "master shell" with managed key application software to push critical content to devices based upon "where" they are inside the geo-referenced "fenced area."

In certain embodiments, the "ownership" (and hence control) of a geo-fenced area may be assigned and/or managed by an entity analogous to the Internet Corporation for Assigned Names and Numbers, the nonprofit organization that is responsible for the coordination of maintenance and methodology of several databases of unique identifiers related to the namespaces of the Internet, and ensuring the network's stable and secure operation. Much of ICANN's work has concerned the Internet's global Domain Name System, including policy development for internationalization of the DNS system, introduction of new generic top-level domains (TLDs), and the operation of root name servers. In accordance with the present invention, owners of real property may register with a similar such entity (which may be a government-sanctioned entity) and be assigned a geo-fence coincident with the metes and bounds of the property. From that basic assignment, various permissions and other applications can be applied. By way of example, the owner of a toll road could be assigned a geo-fence running on either side of the right-of-way and block the sending and receiving of text messages within the boundaries of the geo-fence. The speed and movement of the user's device may be part of the texting permission/denial algorithm.

Another example is a system wherein a customer in a first retail establishment is blocked from receiving notice of a discounted price from a nearby second retail store on a certain item in an effort to tempt the customer to leave the first store and move to the second. In this way, the poaching of customers may be prevented by the owner of a geo-fenced commercial establishment and may be part of the integration of fence permissions.

Figure 3:
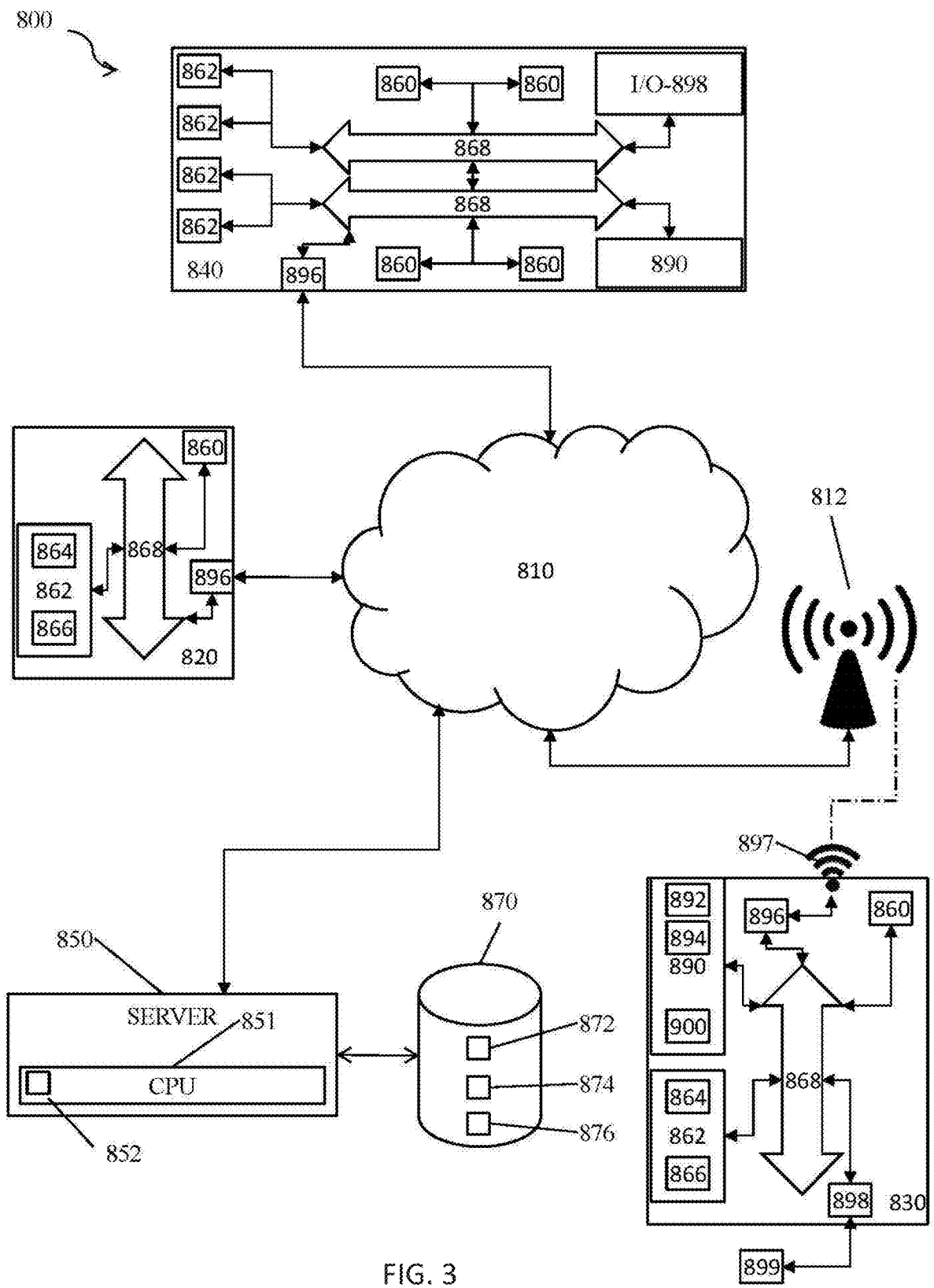
FIG. 3 is a schematic diagram illustrating a virtualized computing network used in one embodiment of the present invention.

FIG. 3 is a schematic diagram of an embodiment of the invention illustrating a computer system, generally described as 800, having a network 810, a plurality of computing devices 820, 830, 840, a server 850 and a database 870.

The server 850 is constructed, configured and coupled to enable communication over a network 810 with a computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a cloud-based network 810 for distributed communication via a wireless communication antenna 812 and processing by a plurality of mobile communication computing devices 830. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 3 multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multiprocessor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 3, may include other components that are not explicitly shown in FIG. 3, or may utilize an architecture completely different than that shown in FIG. 3. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Figure 4:
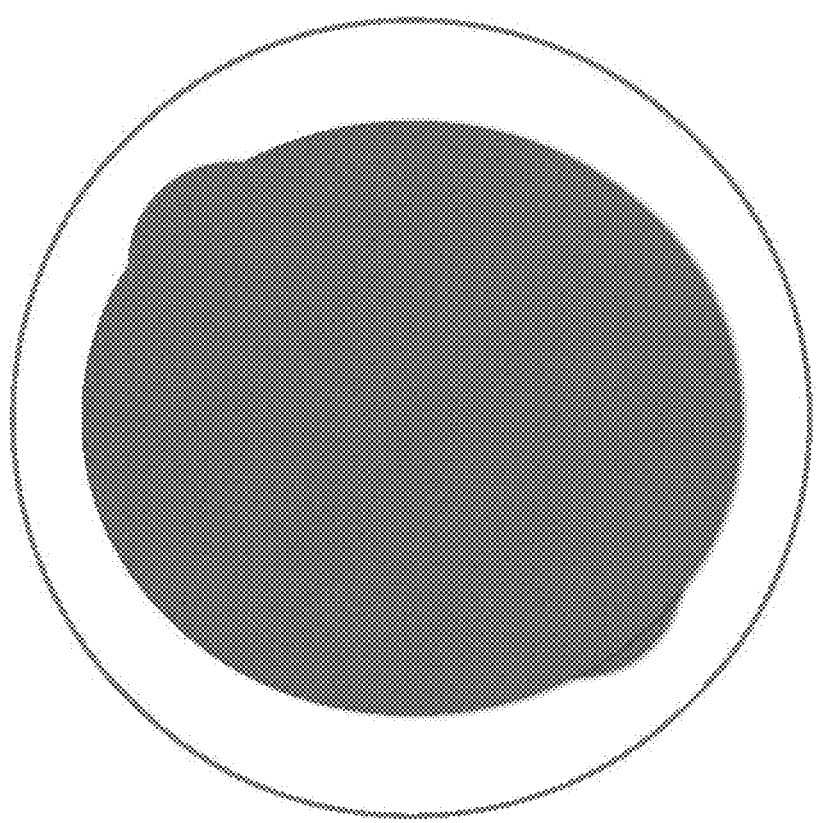
FIG. 4 illustrates a 3-D model overview.

FIG. 4 illustrates a 3-D model overview illustrating how the surface of the Earth is not a perfect sphere; however, as provided by the present invention, a sphere map is generated automatically consisting of points that are represented by IPv6 addresses that superficially wrap around or cover the Earth such that the sphere map encompasses the highest features to represent or approximate the Earth's surface for use with the present invention generation of geofences registry, lookup, categorization within at least one database for geofences.

Figure 5:
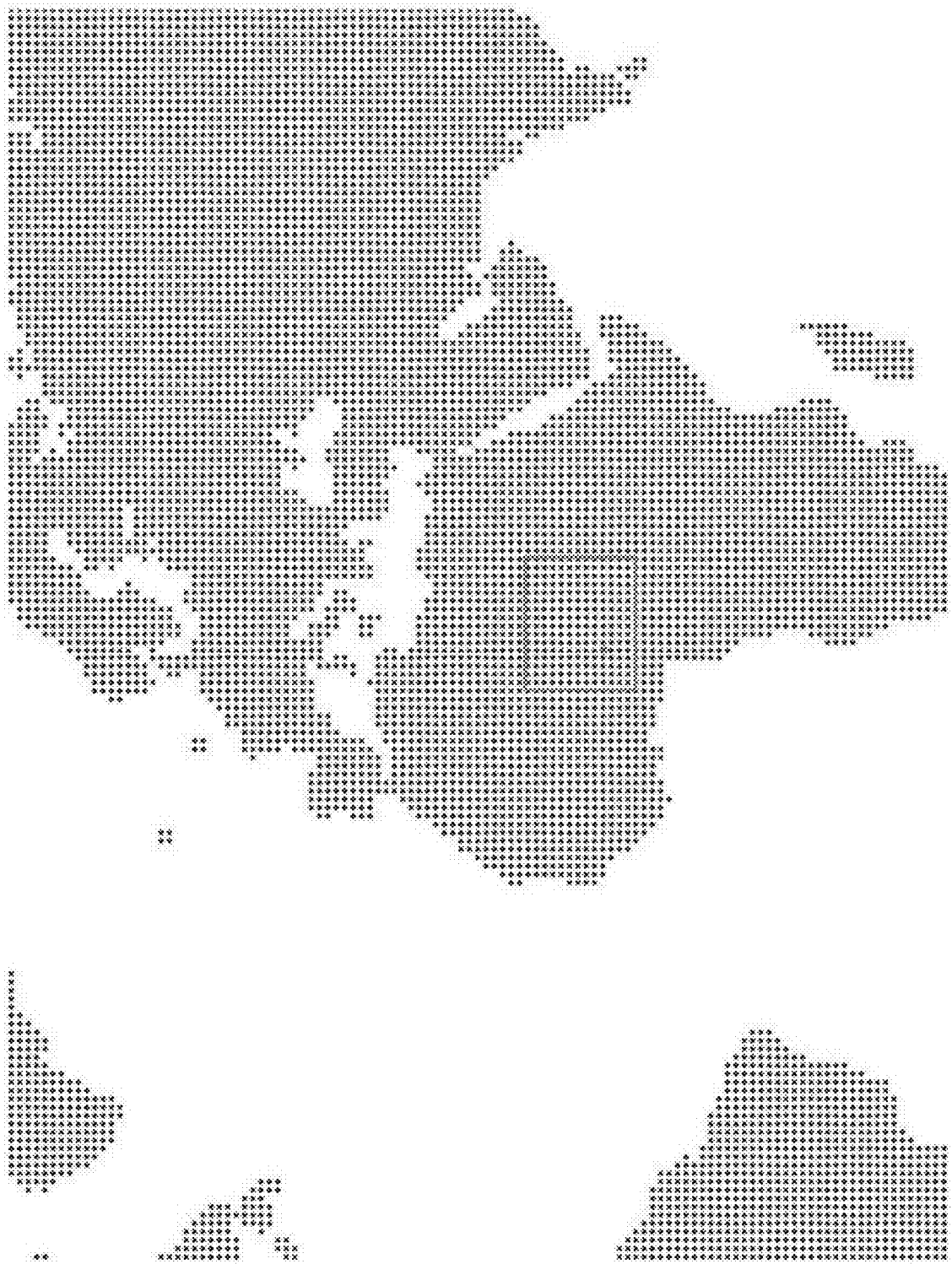
FIG. 5 is a 2-D model overview.

FIG. 5 is a 2-D model overview illustrating another view of mapping the earth for providing visualization of geofences according to the present invention.

Figure 6:
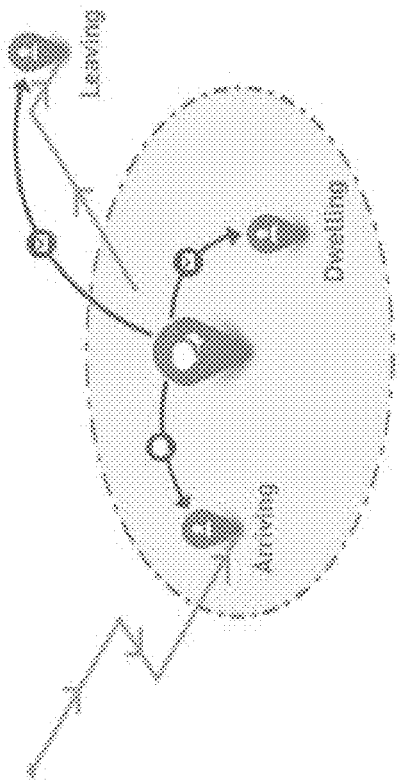
FIG. 6 is a PRIOR ART schematic diagram for geofencing solutions.

FIG. 6 is a PRIOR ART schematic diagram for geofencing solutions. Current prior art geofencing solutions are generally based on centroid fences and the data emitted by the location service frameworks consists of simple messages containing the fence identification (ID) and a notice of entry, exit, or dwelling inside of the fence.

Figure 7:
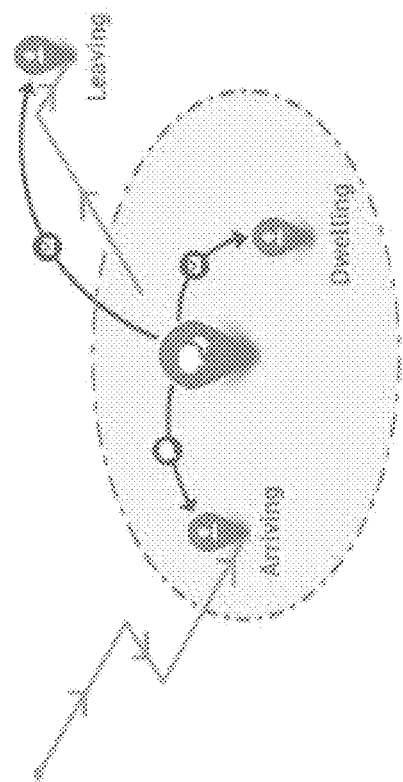
FIG. 7 is a schematic diagram for geofencing solutions according to the present invention.

FIG. 7 is a schematic diagram for geofencing solutions according to the present invention. By contrast and differentiation from prior art, the present invention provides for augmentation of messaging. The approaching, arriving, exiting, and dwelling messages are augmented with metadata describing the ownership and purpose of a geofence through a hierarchy of classes. The purpose of a geofence is defined to include the intended and/or allowed use of services inside or within the geofence boundaries, which are expressed through a system of entitlements that are received as inputs and stored in the at least one geofence database and associated with the geofence data.

Figure 8:
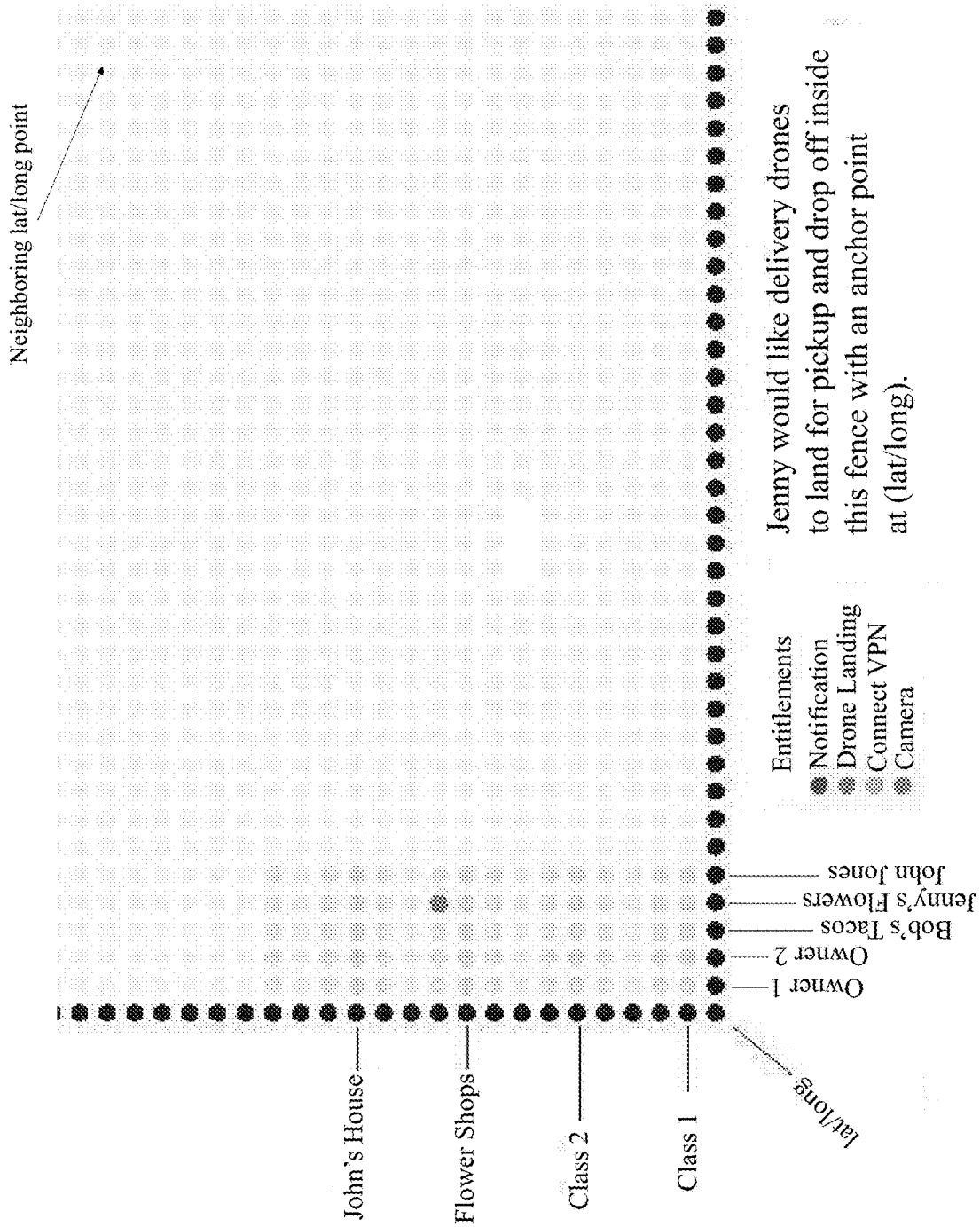
FIG. 8 is a schematic diagram illustrating the encoding of a class and entitlement on an IPv6 address.

FIG. 8 is a schematic diagram illustrating the encoding of a class and entitlement on an IPv6 address. While this illustration is oversimplified, its depiction of encoding of a class and entitlement on an IPv6 address may be extended to provide for billions of positions per location. The lat/long point is the edge of a floating bit boundary; the dots represent the anchor points that the systems and methods of the present invention use for metadata rather than for location. The neighboring lat/long point is the next usable point under which the depicted and described process starts again (or repeats). Significantly, there is only one bit of metadata for each anchor point, but there can be multiple points for each geofence, according to the present invention; this provides for and allows multiple classes and/or entitlements to be expressed and associated with each geofence. In the example case used for this FIG. 8, four example entitlements are illustrated: Notification, Drone Landing, Connect VPN, and Camera. In FIG. 8, the possible entitlements are organized in lines of dots, with a darker dot indicating that the entitlement is allowed for that latitude and longitude. In another embodiment, the entitlements have corresponding colorized points, respectively: red, green, yellow, and blue. The example case is provided for illustration purposes only, and does not intend to limit the claimed invention thereto; the example case shows a user (Jenny/Jenny's Flowers) who would like to allow delivery drones to land for pickup and dropoff inside a predetermined geofence having an anchor point at lat/long as illustrated. Each point is a neighboring lat/long point; Owner 1, Owner 2, Bob's Tacos, Jenny's Flowers, and John Jones are all indicated in this example as geofence owners; Class 1, Class 2, Flower Shops, and John's house are all indicated as geofence classes associated with the indicated example entitlements. The darker point activated for Jenny's Flowers user/owner and for Flower Shops that allows for the entitlement of Drone Landing (darker point) is highlighted to indicate an intended or allowable use of that geofence by the geofence owner. The lighter dots surrounding the darker point represent prospective entitlements which have not been allowed for Notification, Drone Landing, Connect VPN, and Camera.

Figure 9:
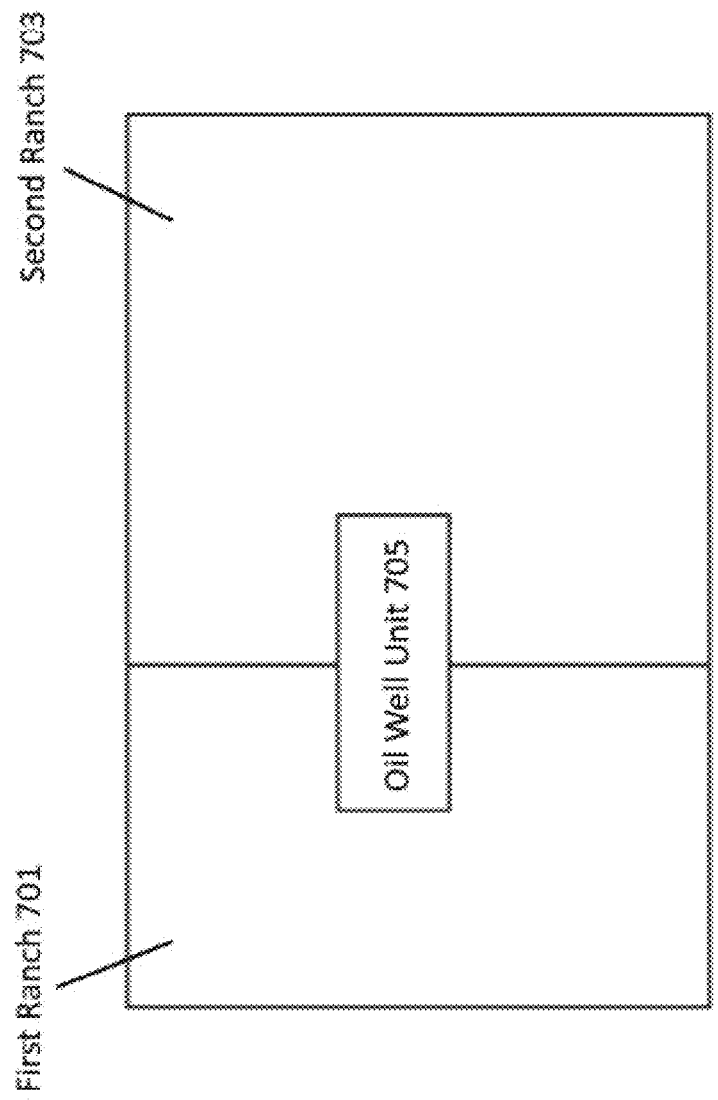
FIG. 9 is a diagram illustrating undivided mineral interests in two ranches.

FIG. 9 is a diagram illustrating undivided mineral interests in two ranches. A first ranch 701 includes an oil and gas lease owned by one company. A second ranch 703 includes an oil and gas lease owned by another company. An oil well unit 705 represents a 40 acre oil unit and the area drained. Geofences are constructed around the oil well unit 705 in accordance with the disclosure herein and the disclosures of U.S. application Ser. Nos. 14/728,259, 14/745,951, 14/755,669 and 14/740,557. The estates in FIG. 9 include surface, mineral, and term leasehold estates. Revenue from production and sale of oil flows electronically based upon an application which simply distributes contract percentages under the systems and methods of the present invention. The operator owns the oil well, so revenue has to flow to the oil company who owns the well, the owners of the leases on the two ranches 701 and 703, overriding royalty owners who are not mineral owners, mineral owners based upon their percentage under the two ranches 701 and 703 based upon the drainage of the oil unit area, and at least two surface owners of the two ranches 701 and 703 who have a contract with the oil company to clean up the surface area. By converting the title of the surface estate, mineral estate, term leasehold estate, and other royalty assignments using the systems and methods of the present disclosure and those disclosed in U.S. application Ser. Nos. 14/728,259, 14/745,951, 14/755,669 and 14/740,557, the network application simplifies the payments to all parties by defining the boundaries using IP addresses.

Figure 10:
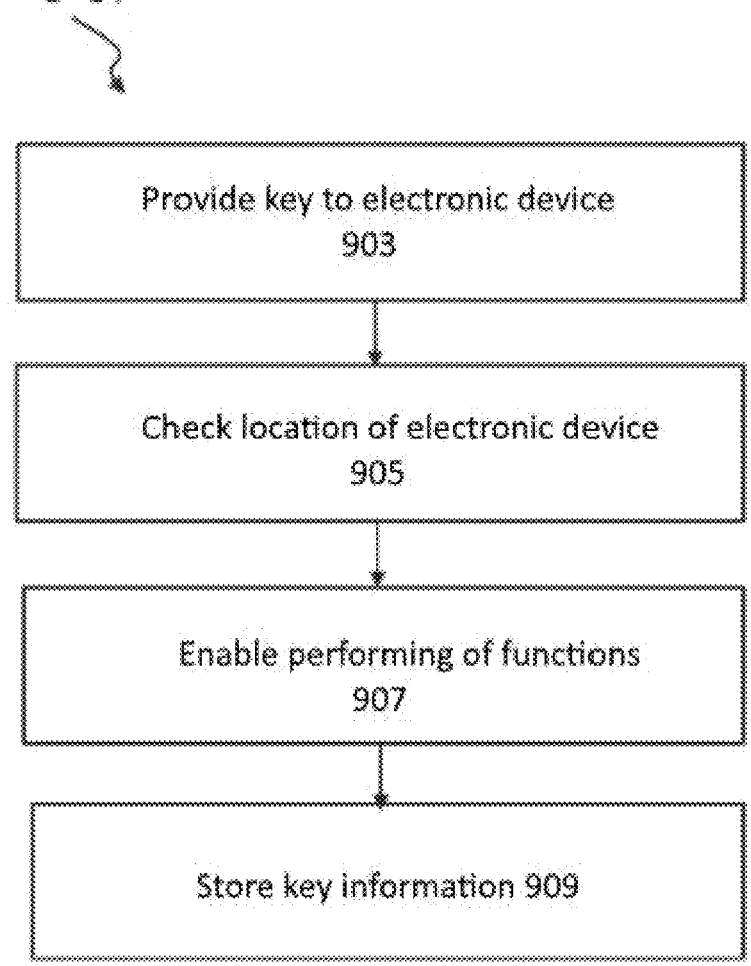
FIG. 10 is a flowchart for managing permissions associated with real estate for electronic devices.

FIG. 10 is a flowchart for managing permissions associated with real estate for electronic devices. The method 901 includes the steps of providing a key associated with real property boundaries to at least one electronic device 903, determining that a location of the at least one electronic device is on the real property boundaries or within the real property boundaries 905, and allowing the at least one electronic device to perform a function on the real property boundaries or within the real property boundaries 907. Optionally, step 909 is performed, which includes the step of storing identifying information for the key associated with real property boundaries and identifying information for the at least one electronic device in a real estate titles and permissions platform. In one embodiment, a server performs steps 903-909. In another embodiment, steps 903-909 are performed by various network elements from FIG. 3.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for managing real estate permissions, comprising:
   a server platform comprising a non-transitory computer readable medium providing volatile or non-volatile storage in network communication with at least one processor-based device;
   wherein the server platform includes at least one master key associated with at least one piece of real estate;
   wherein an Internet Protocol (IP) address is associated with the at least one master key and at least one geographic designator which defines or is located within the at least one piece of real estate;
   wherein the at least one master key is operable to be unlocked by at least one slave key, wherein unlocking the at least one master key provides at least one permission for the at least one processor-based device or implements at least one prohibition on the at least one processor-based device when the at least one processor-based device is located on or within a predetermined proximity of the at least one piece of real estate;
   wherein at least one geofence is associated with the at least one piece of real estate, and wherein the at least one geofence is registered in a geofence database or a geofence registry;
   wherein the geofence database or the geofence registry is operable to receive a query from the at least one processor-based device and is further operable to determine at least one available geofence for the at least one processor-based device to enter based on the query, wherein the at least one available geofence is selected from the at least one geofence; and
   wherein the at least one slave key is operable to be transferred to another processor-based device.

2. The system of claim 1, wherein the at least one permission provides functionality for the at least one processor-based device or the at least one prohibition prohibits functionality for the at least one processor-based device.

3. The system of claim 1, wherein the at least one slave key is unique to the at least one permission or the at least one prohibition.

4. The system of claim 1, wherein the at least one geographic designator is a latitudinal point and a longitudinal point, a set of latitudinal points and longitudinal points, a region of interest (ROI), a county, a municipality, and/or a neighborhood.

5. The system of claim 1, wherein the at least one master key is associated with the at least one geofence for the at least one piece of real estate.

6. The system of claim 1, wherein the at least one permission includes a permission to receive content or a permission to access to content within the at least one geofence.

7. The system of claim 1, wherein network functionality is disabled on the at least one processor-based device based on the at least one prohibition.

8. A system for managing real estate permissions, comprising:
- a server platform comprising a non-transitory computer readable medium providing volatile or non-volatile storage in network communication with at least one processor-based device;
- wherein the server platform includes at least one master key associated with an Internet Protocol (IP) address, wherein the IP address is associated with at least one piece of real estate;
- wherein the at least one master key is operable to be unlocked by at least one slave key, wherein unlocking the at least one master key provides at least one permission for the at least one processor-based device or implements at least one prohibition on the at least one processor-based device;
- wherein the at least one IP address is unique to the at least one piece of real estate; and
- wherein the at least one piece of real estate includes at least one geofence, wherein the at least one geofence is associated with the at least one IP address;
- wherein a geofence database or a geofence registry is operable to receive a query from the at least one processor-based device and is further operable to determine at least one available geofence for the at least one processor-based device to enter based on the query, wherein the at least one available geofence is selected from the at least one geofence; and
- wherein the at least one slave key is operable to be transferred to another processor-based device.

9. The system of claim 8, wherein unlocking the at least one master key provides at least one permission for the at least one processor-based device or implements at least one prohibition on the at least one processor-based device when the at least one processor-based device is located on or within a predetermined proximity of the at least one piece of real estate.

10. The system of claim 8, wherein the at least one geofence, the at least one IP address, and at least one geographic designator associated with the at least one geofence are registered in the geofence database or the geofence registry.

11. The system of claim 10, wherein the at least one geographic designator is a latitudinal point and a longitudinal point, a set of latitudinal points and longitudinal points, a region of interest (ROI), a county, a municipality, and/or a neighborhood.

12. The system of claim 8, wherein the at least one slave key is operable to be duplicated.

13. A method for managing real estate permissions, comprising:
- providing a server platform in network communication with at least one processor-based device;
- at least one slave key unlocking at least one master key associated with at least one piece of real estate, wherein unlocking the at least one master key provides at least one permission for the at least one processor-based device or implements at least one prohibition on the at least one processor-based device when the at least one processor-based device is located on or within a predetermined proximity of the at least one piece of real estate;
- providing the at least one permission to the at least one processor-based device or implementing the at least one prohibition on the at least one processor-based device when the at least one processor-based device is located on or within a predetermined proximity of the at least one piece of real estate;
- a geofence database or a geofence registry receiving a query from the at least one processor-based device and determining at least one available geofence for the at least one processor-based device to enter based on the query; and
- transferring the at least one slave key to another processor-based device,
- wherein the at least one master key is associated with an Internet Protocol (IP) address, wherein the IP address is associated with the at least one piece of real estate;
- wherein the IP address is unique to the at least one piece of real estate; and
- wherein the at least one piece of real estate includes at least one geofence, wherein the at least one geofence includes the at least one available geofence, wherein the at least one geofence is defined by at least one geographic designator, wherein the at least one geographic designator is associated with the at least one IP address.

14. The method of claim 13, wherein the at least one slave key is unique to the at least one permission or the at least one prohibition.

15. The method of claim 13, wherein the at least one geographic designator is a latitudinal point and a longitudinal point, a set of latitudinal points and longitudinal points, a region of interest (ROI), a county, a municipality, and/or a neighborhood.

16. The method of claim 13, further comprising duplicating the at least one slave key.

* * * * *